(12) United States Patent
Suzuki

(10) Patent No.: US 11,487,466 B2
(45) Date of Patent: Nov. 1, 2022

(54) INFORMATION PROCESSING APPARATUS READING DATA USING HOST PHYSCAL ADDRESS AND GUEST PHYSICAL ADDRESS AND COMPUTER-READABLE RECORDING MEDIUM RECORDING CONTROL PROGRAM READING DATA USING HOST PHYSICAL ADDRESS AND GUEST PHYSICAL ADDRESS

(71) Applicant: FUJITSU LIMITED, Kawasaki (JP)

(72) Inventor: Kazuhiro Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/317,941

(22) Filed: May 12, 2021

(65) Prior Publication Data
US 2022/0019371 A1    Jan. 20, 2022

(30) Foreign Application Priority Data
Jul. 16, 2020    (JP) .............................. JP2020-122440

(51) Int. Cl.
*G06F 3/06*    (2006.01)

(52) U.S. Cl.
CPC .......... *G06F 3/0655* (2013.01); *G06F 3/0604* (2013.01); *G06F 3/067* (2013.01)

(58) Field of Classification Search
CPC ....... G06F 3/0655; G06F 3/067; G06F 3/0604
See application file for complete search history.

(56) References Cited

U.S. PATENT DOCUMENTS

| | | |
|---|---|---|
| 2003/0172149 A1 | 9/2003 | Edsall et al. |
| 2007/0288700 A1 | 12/2007 | Tamura et al. |
| 2014/0281056 A1 * | 9/2014 | Davda ................. G06F 12/1027 710/26 |
| 2016/0350244 A1 * | 12/2016 | Tsirkin .................. G06F 3/0664 |
| 2018/0373647 A1 * | 12/2018 | Dewan ................ G06F 12/1027 |
| 2019/0102326 A1 * | 4/2019 | Agarwal ............... G06F 13/161 |

FOREIGN PATENT DOCUMENTS

| | | |
|---|---|---|
| JP | 2005-525619 A | 8/2005 |
| JP | 2007-328611 A | 12/2007 |

OTHER PUBLICATIONS

The Linux Kernel: "Device Driver", [online] https://linuxjf.osdn.jp/JFdocs/The-Linux-Kernel-9.html [Internet Search: Jun. 11, 2020] (Total 41 pages).

* cited by examiner

*Primary Examiner* — Mark A Giardino, Jr.
(74) *Attorney, Agent, or Firm* — Fujitsu Patent Center

(57) ABSTRACT

An information processing apparatus coupled to a storage device via a network includes a processor configured to: acquire a host physical address over a physical storage region in which information regarding an access to the storage device from a guest OS is stored from a first packet stored in the physical storage region storing a packet obtained by encapsulating the information regarding the access; convert the acquired host physical address into a guest physical address recognized by the guest OS; create a data structure of a block device; store the guest physical address in a data address region of the data structure; specify the host physical address corresponding to the guest physical address while referring to the memory when reading from the data address region is detected; read data from the specified host physical address over the physical storage region; and transfer the read data to the guest OS.

6 Claims, 20 Drawing Sheets

INFORMATION PROCESSING APPARATUS READING DATA USING HOST PHYSCAL ADDRESS AND GUEST PHYSICAL ADDRESS AND COMPUTER-READABLE RECORDING MEDIUM RECORDING CONTROL PROGRAM READING DATA USING HOST PHYSICAL ADDRESS AND GUEST PHYSICAL ADDRESS

CROSS-REFERENCE TO RELATED APPLICATION

This application is based upon and claims the benefit of priority of the prior Japanese Patent Application No. 2020-122440, filed on Jul. 16, 2020, the entire contents of which are incorporated herein by reference.

FIELD

The embodiments discussed herein are related to an information processing apparatus and a computer-readable recording medium.

BACKGROUND

In related art, as a protocol for constructing a storage area network (SAN) by using an Internet Protocol (IP) network, there is Internet Small Computer System Interface (iSCSI). The iSCSI integrates a SCSI command and data into one IP packet, and transfers the SCSI command and data by using the Transmission Control Protocol (TCP)/IP.

An example of related art is Japanese National Publication of International Patent Application No. 2005-525619.

An example of related art is Japanese Laid-open Patent Publication No. 2007-328611.

SUMMARY

According to an aspect of the embodiments, an information processing apparatus coupled to a storage device via a network includes: a memory; and a processor coupled to the memory and configured to: acquire a host physical address over a physical storage region in which information regarding an access to the storage device from a guest operating system (OS) operating in the information processing apparatus is stored from a first packet stored in the physical storage region storing a packet obtained by encapsulating the information regarding the access; convert the acquired host physical address into a guest physical address recognized by the guest OS; store the host physical address and the guest physical address in the memory in association with each other; create a data structure of a block device used by the guest OS; store; the guest physical address which is converted in a data address region of the data structure; specify the host physical address corresponding to the guest physical address stored in the data address region while referring to the memory when reading from the data address region is detected; read data from the specified host physical address over the physical storage region; and transfer the read data to the guest OS.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

For example, there is a technology for implementing virtualization of storing over a network apparatus of the storage area network. There is a technology for constructing the same logical device configuration in a plurality of storage virtualization apparatuses.

However, in related art, it is difficult to perform high-speed data transfer in an environment in which a storage device (for example, an iSCSI storage) over an IP network is used from a virtual machine (VM).

In one aspect, high-speed access in an environment in which a storage device over a network is used from a virtual machine may be enabled.

Hereinafter, embodiments of an information processing apparatus and an access control program according to the present disclosure will be described in detail with reference to the drawings.

Embodiment 1

First, a system configuration example of a storage system according to Embodiment 1 will be described. The storage system is applied to, for example, a service for lending virtual machines to customers by infrastructure as a service (IaaS).

Figure 1:
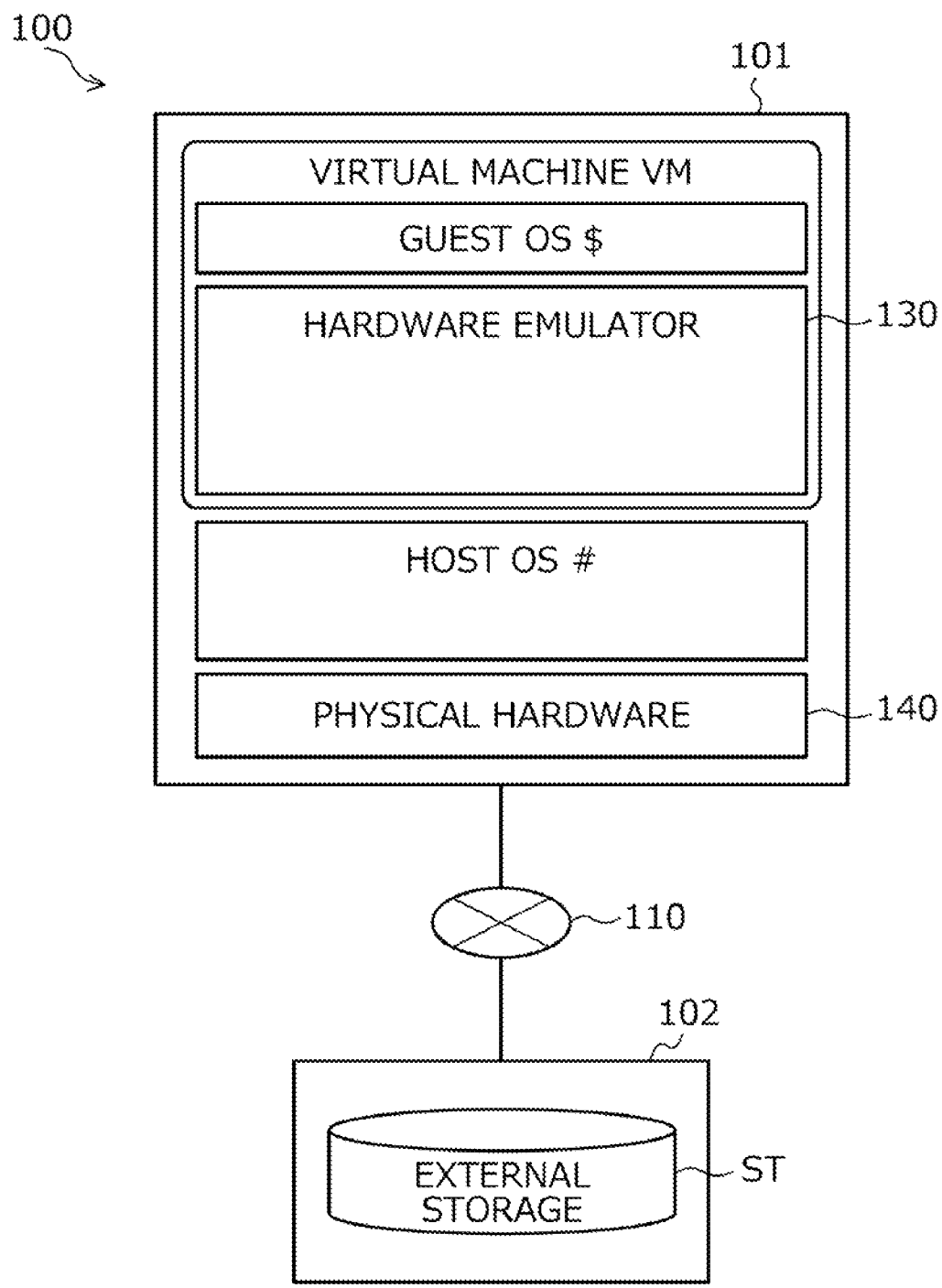
FIG. 1 is an explanatory diagram illustrating a system configuration example of a storage system.

FIG. 1 is an explanatory diagram illustrating a system configuration example of a storage system. In FIG. 1, a storage system 100 includes an information processing apparatus 101 and a storage device 102. In the storage system 100, the information processing apparatus 101 and the storage device 102 are coupled to each other via a wired or wireless network 110. The network 110 is, for example, a local area network (LAN), a wide area network (WAN), the Internet, or the like.

The information processing apparatus 101 is a computer capable of executing a virtual machine VM. The virtual machines VM are virtual computers that operate in execution environments constructed by dividing hardware resources of physical computers. The information processing apparatus 101 is, for example, a cloud computing server.

For example, the information processing apparatus 101 includes, for example, a host operating system (OS) # and a hardware emulator 130. The host OS # operates a virtual OS (for example, a guest OS $) in a virtual computer environment. For example, the host OS # is an OS in which a hypervisor is incorporated. The hypervisor is software for operating a plurality of virtual machines in parallel. However, a function of the host OS # may be realized by a hypervisor.

The hardware emulator 130 is software that virtualizes physical hardware 140 under the control of the host OS # such that the physical hardware is seen to the guest OS $ of the virtual machine VM. The guest OS $ is an OS operating over the virtual machine VM. The physical hardware 140 is physical devices such as, for example, a memory, a network interface card (NIC), or a disk. The physical hardware 140 will be described in detail later with reference to FIG. 2.

The storage device 102 is a computer that includes a storage ST and controls access to the storage ST. The storage ST is a storage device that stores data. The storage ST is, for example, a hard disk drive (HDD) or a solid-state drive (SSD). The storage device 102 is, for example, a server.

In the following description, "SCSI" is used as an example of a protocol for accessing a local storage device. "iSCSI" will be described as an example of a protocol for transmitting data related to access to a storage device to an IP network. However, a protocol other than SCSI may be used as the protocol for accessing the local storage device. A protocol other than iSCSI may be used as the protocol for transmitting the data related to the access to the storage device to the IP network. The storage ST coupled to the information processing apparatus 101 via the IP network may be referred to as "external storage ST".

An iSCSI device may be used from the virtual machine VM. The iSCSI device is a storage device (for example, the external storage ST) accessed via the IP network. The iSCSI integrates a SCSI command and data into one IP packet, and transfers the SCSI command and data by using the TCP/IP. The SCSI command is a command used when the storage and the computer perform communication and control.

When the iSCSI device is used from the virtual machine VM, infrastructure may perform storage coupling management. The infrastructure is a system for managing the storage system 100, for example, a system for managing a service for lending the virtual machines VM.

The storage coupling is controlled from the infrastructure, and thus, for example, coupling to a virtual machine VM of a user may be transparently recovered even when node down or migration occurs. For example, when the node down or migration occurs, resetting a storage of a coupling destination or the like is not demanded to be performed from the user side, and thus, it is convenient for the user.

As a storage coupling method in an environment in which the infrastructure performs the storage coupling management, for example, there are means 1 and 2 of related art.

In the means 1 of related art, first, the host OS recognizes the iSCSI device as a block device by executing a command and mounting the iSCSI device. As the command for mounting the external storage on a physical server, there is an iscsiadm command such as, for example, "iscsiadm—mode discovery—type sendtargets—portal 192.168.1.34—login".

Subsequently, the host OS attaches the recognized block device "/dev/sdb" to the virtual machine by executing a command and issuing an instruction to the hardware emulator. As the command for attaching the block device to the virtual machine, there is a virsh attach-disk command such as, for example, "virsh attach-disk dom/dev/sdb vdb".

Accordingly, the virtual machine recognizes a block device "/dev/vdb". In order to distinguish the block devices which are respectively recognized by the host OS and the virtual machine from each other for example, different names (/dev/sdb and/dev/vdb) are set for the block devices.

The host OS accesses the storage from the virtual machine by copying a buffer over the physical server to a buffer of the guest OS. For example, the host OS accesses data from the virtual machine by copying data in the external storage to the buffer over the physical server and copying data in the buffer over the physical server to a buffer over the virtual machine.

However, in the means 1 of related art, since the storage is accessed from the virtual machine, the buffer copy occurs between the host OS and the guest OS, and thus, there is a problem that high-speed access is not possible. For example, since the infrastructure performs the storage coupling management, the block device "/dev/sdb" is not directly attached to the virtual machine, and thus, the buffer copy occurs.

As the means 2 of related art, it is considered that a physical NIC is attached to the virtual machine by Peripheral Component Interconnect (PCI) pass-through. The PCI pass-through is a mechanism for causing the physical device to be directly attached to the virtual machine.

However, in the means 2 of related art, since the iSCSI coupling is demanded to be performed on the virtual machine side, control may not be performed from the infrastructure. In order to perform the control from the infrastructure, the virtual machine of the user is demanded to be modified. For example, a mechanism (demon, agent, or the like) for receiving designation of a device to be coupled from the infrastructure and tapping a command to attach the device is demanded to be introduced to the virtual machine.

Thus, in Embodiment 1, the information processing apparatus 101 that enables high-speed access by reducing unnecessary buffer copy without the virtual machine being aware of iSCSI in an environment in which the iSCSI storage (external storage ST) is used from the virtual machine VM will be described.

Although each information processing apparatus 101 and each storage device 102 are illustrated by one in the example illustrated in FIG. 1, the present disclosure is not limited thereto. For example, the storage system 100 may include a plurality of information processing apparatuses 101 and a plurality of storage devices 102.

(Hardware Configuration Example of Information Processing Apparatus 101)

Figure 2:
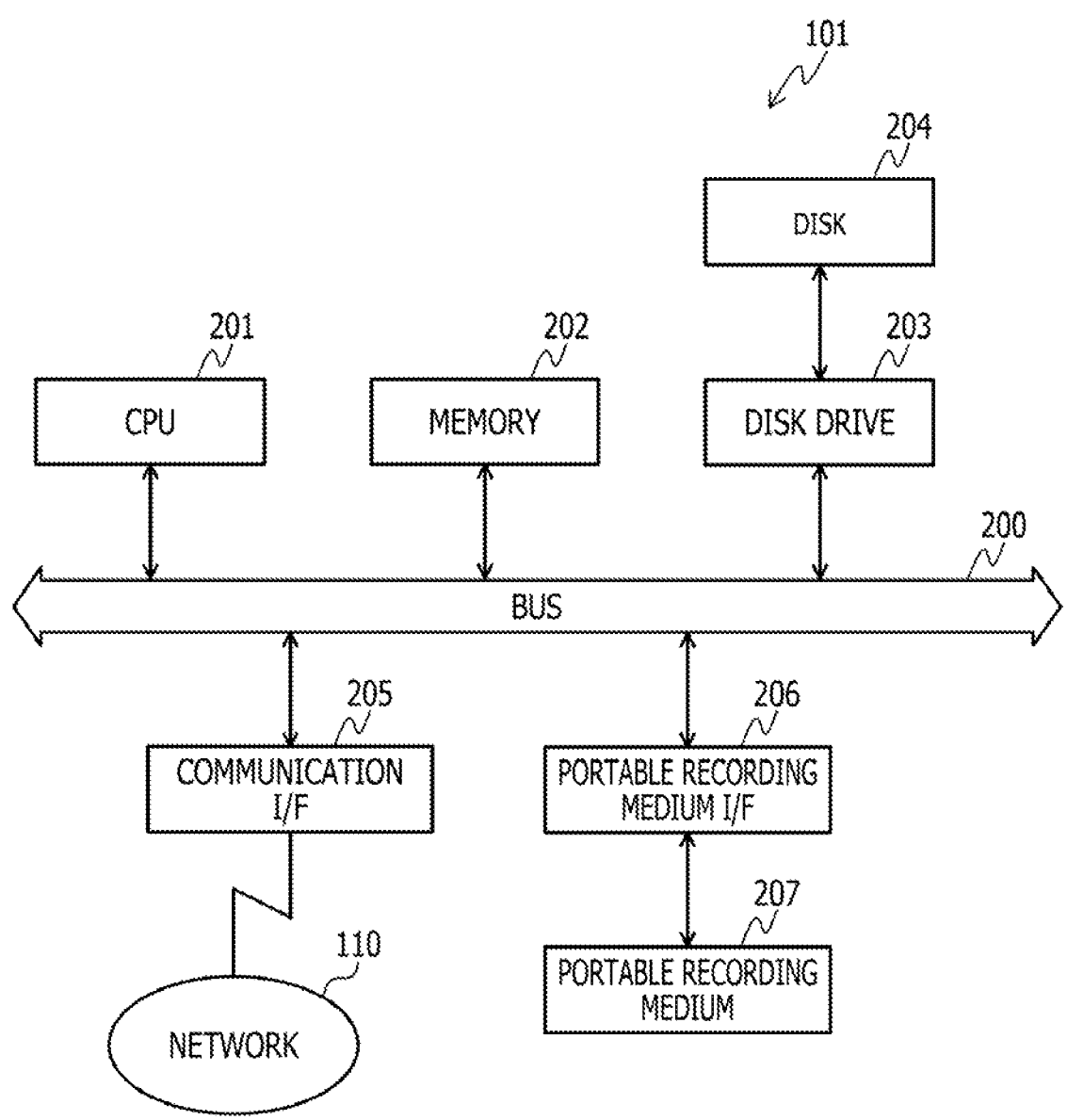
FIG. 2 is a block diagram illustrating a hardware configuration example of an information processing apparatus.

FIG. 2 is a block diagram illustrating a hardware configuration example of the information processing apparatus 101. In FIG. 2, the information processing apparatus 101 has a central processing unit (CPU) 201, a memory 202, a disk drive 203, a disk 204, a communication interface (I/F) 205, a portable recording medium I/F 206, and a portable recording medium 207. These components are coupled to one another via a bus 200.

The CPU 201 controls the entirety of the information processing apparatus 101. The CPU 201 may have multiple cores. The memory 202 includes, for example, a read-only memory (ROM), a random-access memory (RAM), a flash ROM, and the like. For example, the flash ROM stores a program of an operating system (OS), the ROM stores an application program, and the RAM is used as a work area of the CPU 201. The programs stored in the memory 202 cause the CPU 201 to execute coded processing by being loaded into the CPU 201.

The disk drive 203 controls reading and writing of data from and to the disk 204 according to the control of the CPU 201. The disk 204 stores written data under the control of the disk drive 203. As the disk 204, for example, there are a magnetic disk, an optical disk, and the like.

The communication I/F 205 is coupled to the network 110 via a communication line, and is coupled to an external computer (for example, the storage device 102 illustrated in FIG. 1) via the network 110. The communication I/F 205 functions as an interface between the network 110 and the inside of the apparatus and controls input and output of data from and to the external computer. For example, a NIC, a LAN adapter, or the like may be employed as the communication I/F 205.

The portable recording medium I/F 206 controls reading and writing of data from and to the portable recording medium 207 according to the control of the CPU 201. The portable recording medium 207 stores written data under the control of the portable recording medium I/F 206. As the portable recording medium 207, for example, there are a compact disc (CD)-ROM, a Digital Versatile Disc (DVD), a Universal Serial Bus (USB) memory, and the like.

In addition to the above-described components, the information processing apparatus 101 may include, for example, a solid-state drive (SSD), an input device, a display, and the like. The information processing apparatus 101 may not include, for example, the disk drive 203, the disk 204, the portable recording medium I/F 206, and the portable recording medium 207 among the above-described components. The storage device 102 illustrated in FIG. 1 may also be realized by a hardware configuration similar to that of the information processing apparatus 101.

(Data Structure Example of iSCSI Packet)

A data structure example of the iSCSI packet will be described. The iSCSI packet is an example of the IP packet exchanged between the information processing apparatus 101 and the storage device 102.

Figure 3:
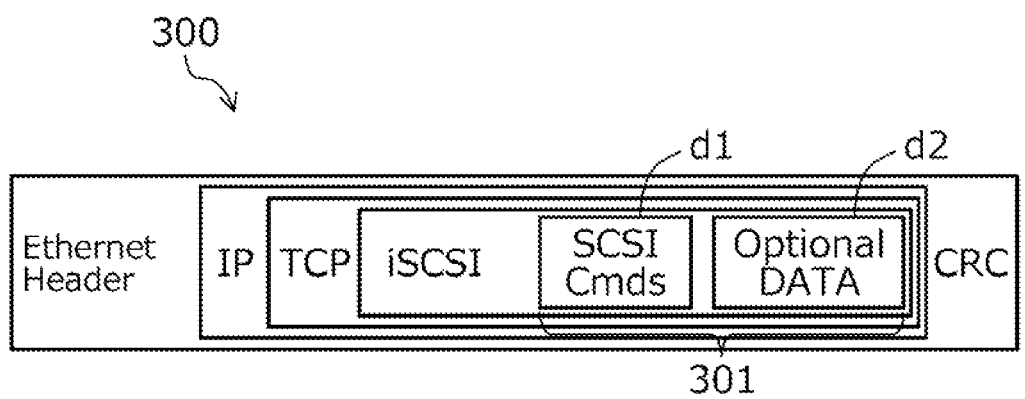
FIG. 3 is an explanatory diagram illustrating a data structure example of an iSCSI packet.

FIG. 3 is an explanatory diagram illustrating the data structure example of the iSCSI packet. In FIG. 3, an iSCSI packet 300 is obtained by encapsulating SCSI data 301 with the IP packet. The SCSI data 301 is information (SCSI I/O) related to the access to the external storage ST and includes SCSI commands d1 and data d2.

The SCSI command d1 is a command of SCSI for the external storage ST. The data d2 is, for example, a response to the SCSI command d1. The response is, for example, data read from the external storage ST by the SCSI command d1. The data d2 is, for example, data to be written to the external storage ST by the SCSI command d1.

(Stored Contents of Address Management Table 400)

Next, contents stored in an address management table 400 of the host OS # will be described. The address management table 400 is realized by a storage device such as, for example, the memory 202 or the disk 204 illustrated in FIG. 2.

Figure 4:
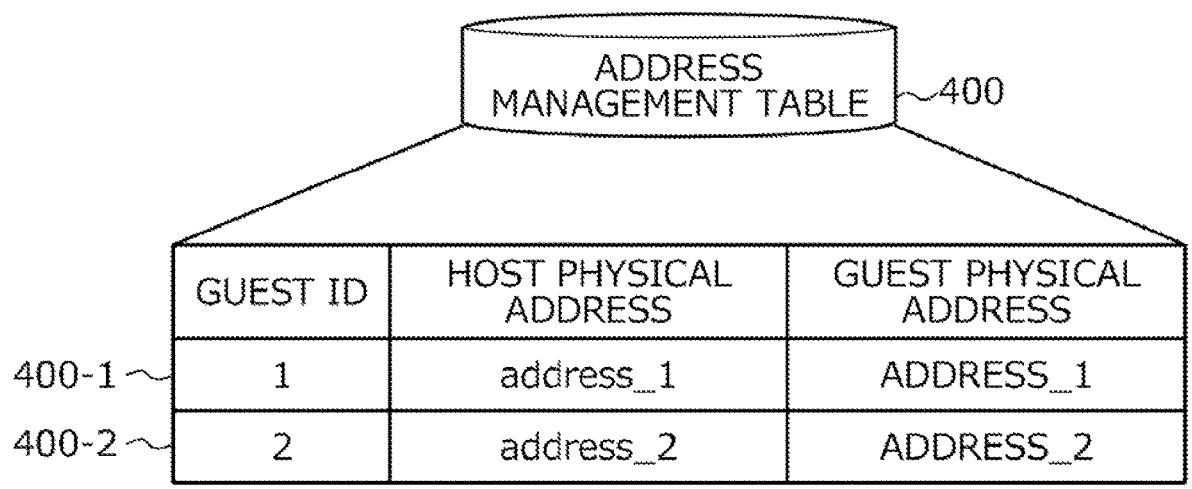
FIG. 4 is an explanatory diagram illustrating an example of stored contents of an address management table.

FIG. 4 is an explanatory diagram illustrating an example of the stored contents of the address management table 400. In FIG. 4, the address management table 400 has fields of a guest ID, a host physical address, and a guest physical address, and stores, as records, pieces of address management information (for example, pieces of address management information 400-1 and 400-2) by setting information in each field.

The guest ID is an identifier that uniquely identifies the guest OS $ (virtual machine VM) operating over the information processing apparatus 101. The host physical address indicates a head address of a buffer of the NIC storing the iSCSI packet 300 (see FIG. 3) in which the SCSI data 301 is stored. The guest physical address is obtained by converting a host physical address into a guest physical address.

(Address Space of Virtual Machine Environment)

Next, an address space of a virtual machine environment will be described.

Figure 5:
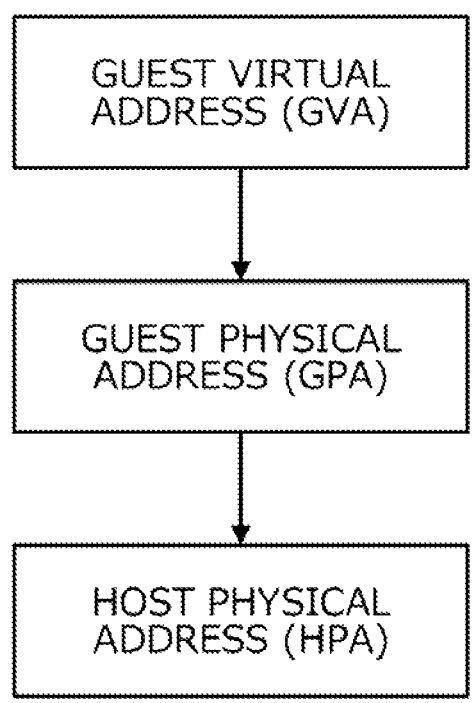
FIG. 5 is an explanatory diagram illustrating an address space of a virtual machine environment.

FIG. 5 is an explanatory diagram illustrating the address space of the virtual machine environment. In FIG. 5, the address space of the virtual machine environment is a three-hierarchy address space of a guest virtual address (GVA), a guest physical address (GPA), and a host physical address (HPA).

The guest virtual address is a virtual address space managed by the guest OS $ (see FIG. 1). The guest physical address is recognized as a physical address by the guest OS $, and is a virtual address space provided by the host OS #(hypervisor).

The host physical address is a physical address space of a physical machine (information processing apparatus 101) recognized by the host OS #. The conversion from the guest virtual address to the guest physical address is performed by the guest OS $. The conversion from the guest physical address to the host physical address is performed by the host OS #.

For example, the host OS # virtualizes the host physical address so as to be seen as the guest physical address to the guest OS $. The guest OS $ virtualizes the guest physical address so as to be seen as the guest virtual address to an application (hereinafter, referred to as an "application Ap") operating over the guest OS $ (virtual machine VM).

(Functional Configuration Example of Information Processing Apparatus 101)

Next, a functional configuration example of the information processing apparatus 101 according to Embodiment 1 will be described.

Figure 6:
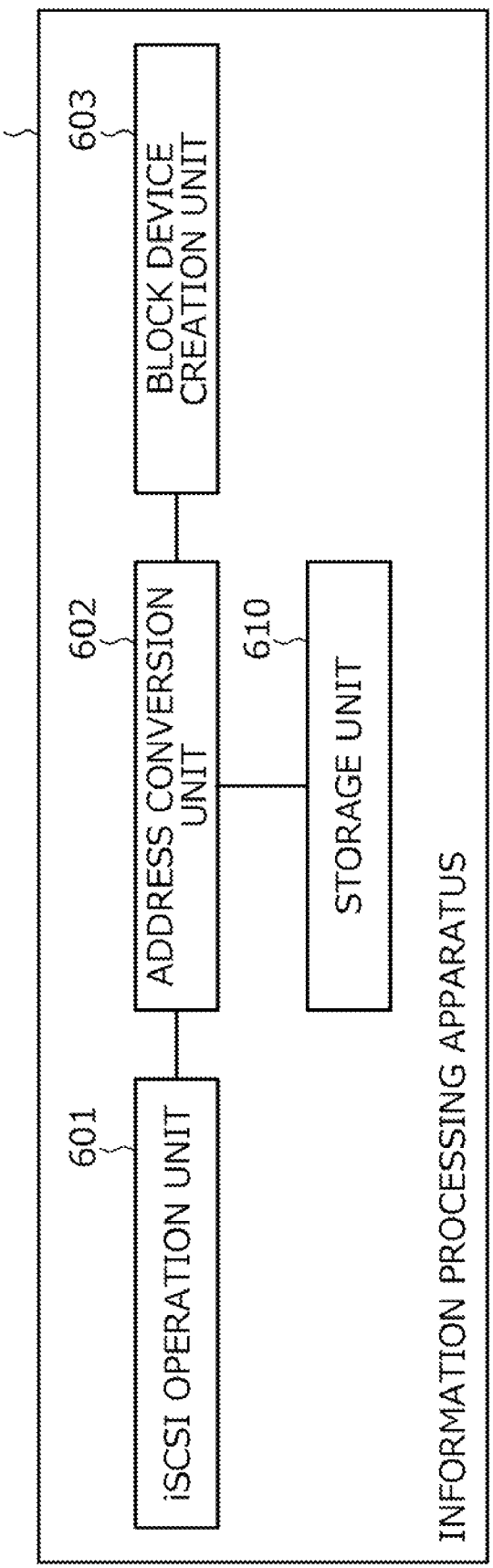
FIG. 6 is a block diagram illustrating a functional configuration example of an information processing apparatus according to Embodiment 1.

FIG. 6 is a block diagram illustrating a functional configuration example of the information processing apparatus 101 according to Embodiment 1. In FIG. 6, the information processing apparatus 101 includes an iSCSI operation unit 601, an address conversion unit 602, a block device creation unit 603, and a storage unit 610. The iSCSI operation unit 601 to the block device creation unit 603 function a first control unit and a second control unit. For example, the functions are realized by the CPU 201 executing the program stored in the storage device such as, for example, the memory 202, the disk 204, or the portable recording medium 207 illustrated in FIG. 2 or by the communication I/F 205. A processing result of each functional unit is stored in the storage device such as, for example, the memory 202 or the disk 204. The storage unit 610 is realized by the storage device such as, for example, the memory 202 or the disk 204. For example, the iSCSI operation unit 601 and the address conversion unit 602 operate over, the host OS #(first control unit). The block device creation unit 603 operates over the hardware emulator 130 (second control unit). The storage unit 610 stores, for example, the address management table 400 illustrated in FIG. 4.

The iSCSI operation unit 601 acquires a host physical address (hereinafter, referred to as a "first physical address") over a physical storage region in which the SCSI data is stored from a first packet (iSCSI packet) stored in a physical storage region. The physical storage region stores packets transmitted via the IP network. The first packet is, for example, an iSCSI packet transmitted via the IP network. The physical storage region is, for example, the buffer of the NIC storing the iSCSI packet from the storage device 102 (external storage ST).

The iSCSI packet is a packet transmitted via the IP network, and is a packet obtained by encapsulating the information related to the access to the external storage ST. The data related to the access to the external storage ST is, for example, the SCSI data 301 (SCSI command d1 and data d2) illustrated in FIG. 3.

For example, the iSCSI operation unit 601 performs, for example, iSCSI login processing. The iSCSI login processing is, for example, processing of establishing a session by performing authentication or the like between an initiator and a target (external storage ST) and recognizing the target. The iSCSI operation unit 601 monitors the iSCSI packet arriving at the NIC after the login processing.

When the iSCSI packet arrives at the NIC, the iSCSI operation unit 601 acquires the first physical address over the buffer of the NIC in which the SCSI data is stored from the iSCSI packet stored in the buffer of the NIC. The first physical address is, for example, a host physical address indicating the head address of the SCSI data 301 (see FIG. 3) in the iSCSI packet.

The address conversion unit 602 converts the acquired first physical address into a guest physical address (hereinafter, referred to as a "second physical address") recognized by the guest OS $ operating over the hardware emulator 130. The address conversion unit 602 stores the acquired first physical address and the converted second physical address in the storage unit 610 in association with each other.

For example, the address conversion unit 602 converts the acquired first physical address into the corresponding second physical address while referring to, for example, information indicating a correspondence between the host physical address and the guest physical address. Then, the address conversion unit 602 stores the first physical address and the second physical address in the address management table 400 illustrated in FIG. 4 in association with the guest ID of the guest OS $.

The block device creation unit 603 creates a data structure of the block device used by the guest OS $. The data structure of the block device is information stored over the memory of the guest OS $ in order to access the block device. The data structure is created for each block device. For example, a device ID that uniquely identifies the block device is set in the data structure.

In the following description, the data structure of the block device may be referred to as a "block device structure".

When the block device structure is created, the guest OS $ may recognize the block device. The block device creation unit 603 writes the converted second physical address in a data address region of the created block device structure. The data address region stores a pointer for data.

For example, in Linux (Registered trademark), the data over the block device may be traced in a blkdevs structure. For the block device structure, for example, a URL "https://linuxjf.osdn.jp/JFdocs/The-Linux-Kernel-9.html" may be referred to.

When the reading from the data address region of the block device of the guest OS $ is detected, the address conversion unit 602 specifies the first physical address (host physical address) corresponding to the second physical address (guest physical address) stored in the data address region while referring to the storage unit 610. The address conversion unit 602 reads data from the physical storage region based on the specified first physical address.

The physical storage region stores, for example, an iSCSI packet including data read from the external storage ST, which is a response to the SCSI command (reading of data) for the external storage ST. The address conversion unit 602 transfers the read data to the application Ap.

For example, when the reading of the guest physical address from the data address region of the block device by the application Ap over the guest OS $ is detected, the address conversion unit 602 searches for the address management information corresponding to the guest ID of the guest OS $ while referring to, for example, the address management table 400.

The address conversion unit 602 converts the read guest physical address into the corresponding host physical address while referring to the searched address management information. Subsequently, the address conversion unit 602 directly reads data from the converted host physical address in the buffer of the NIC. The address conversion unit 602 transfers the read data to the application Ap.

When data is written from the application Ap to the block device, the address conversion unit 602 converts a guest physical address of a writing destination into the host physical address while referring to, for example, the address management table 400. The address conversion unit 602 writes data to the converted host physical address in the buffer of the NIC. As a result, for example, the iSCSI packet including the data is transmitted to the storage device 102, and the data is written to the external storage ST.

(Operation Example of Storage System 100)

Next, an operation example of the storage system 100 according to Embodiment 1 will be described. First, operation examples in setting phases will be described with reference to FIGS. 7 to 9. It is assumed that the guest OS $ is a "guest OS 1".

Figure 7:
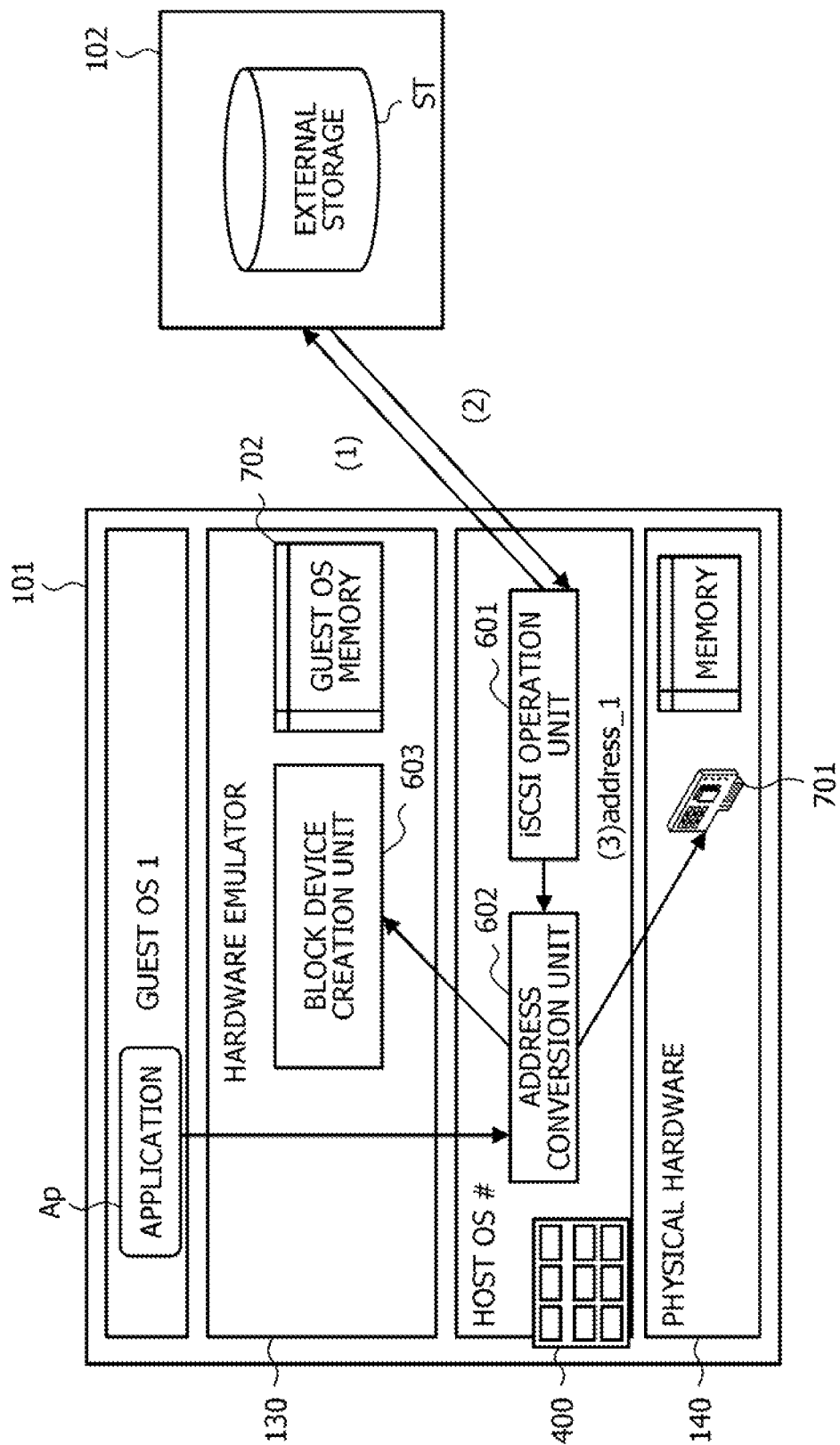
FIG. 7 is an explanatory diagram (part 1) illustrating an operation example in a setting phase of a storage system according to Embodiment 1.
Figure 8:
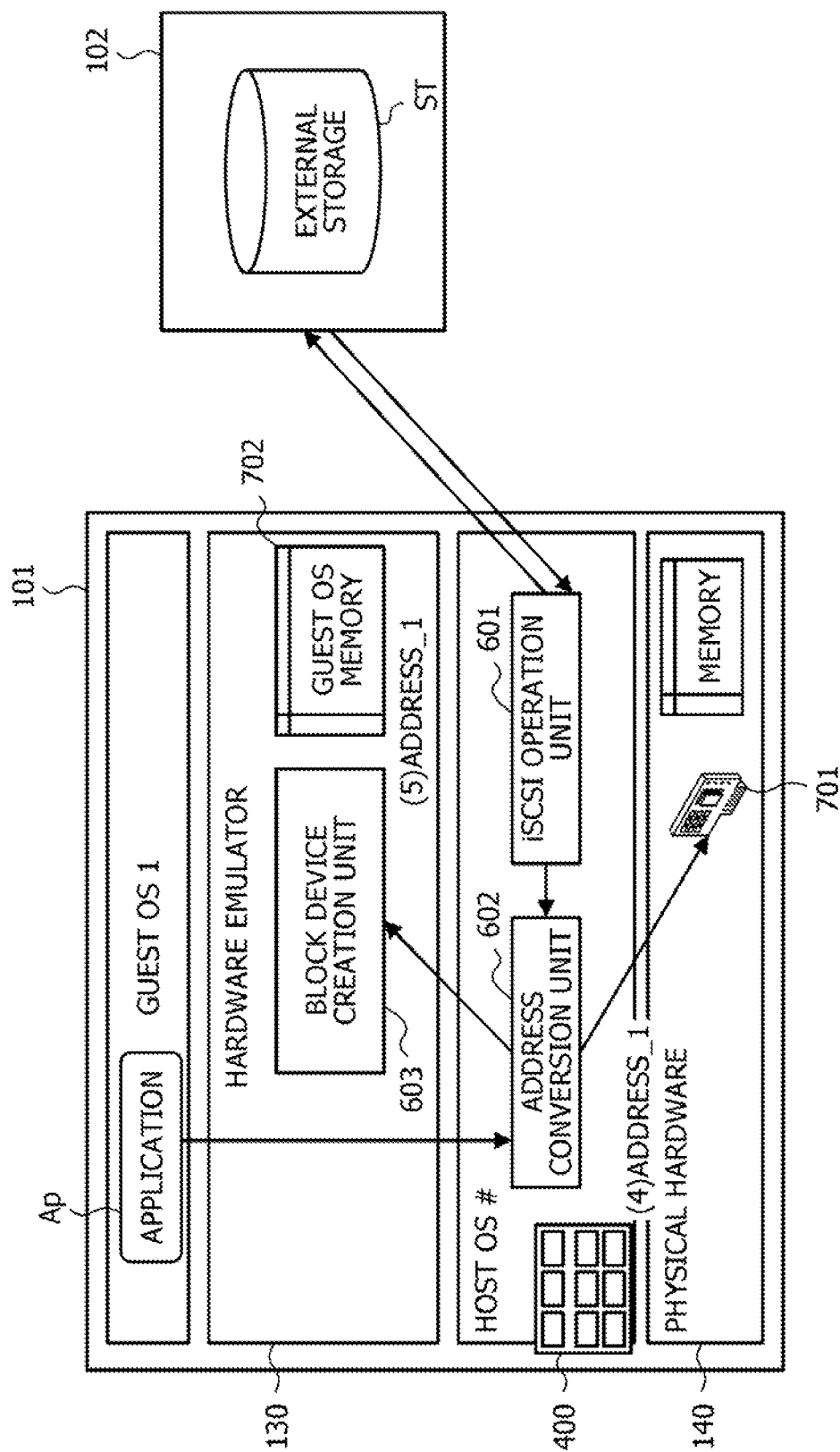
FIG. 8 is an explanatory diagram (part 2) illustrating the operation example in the setting phase of the storage system according to Embodiment 1.
Figure 9:
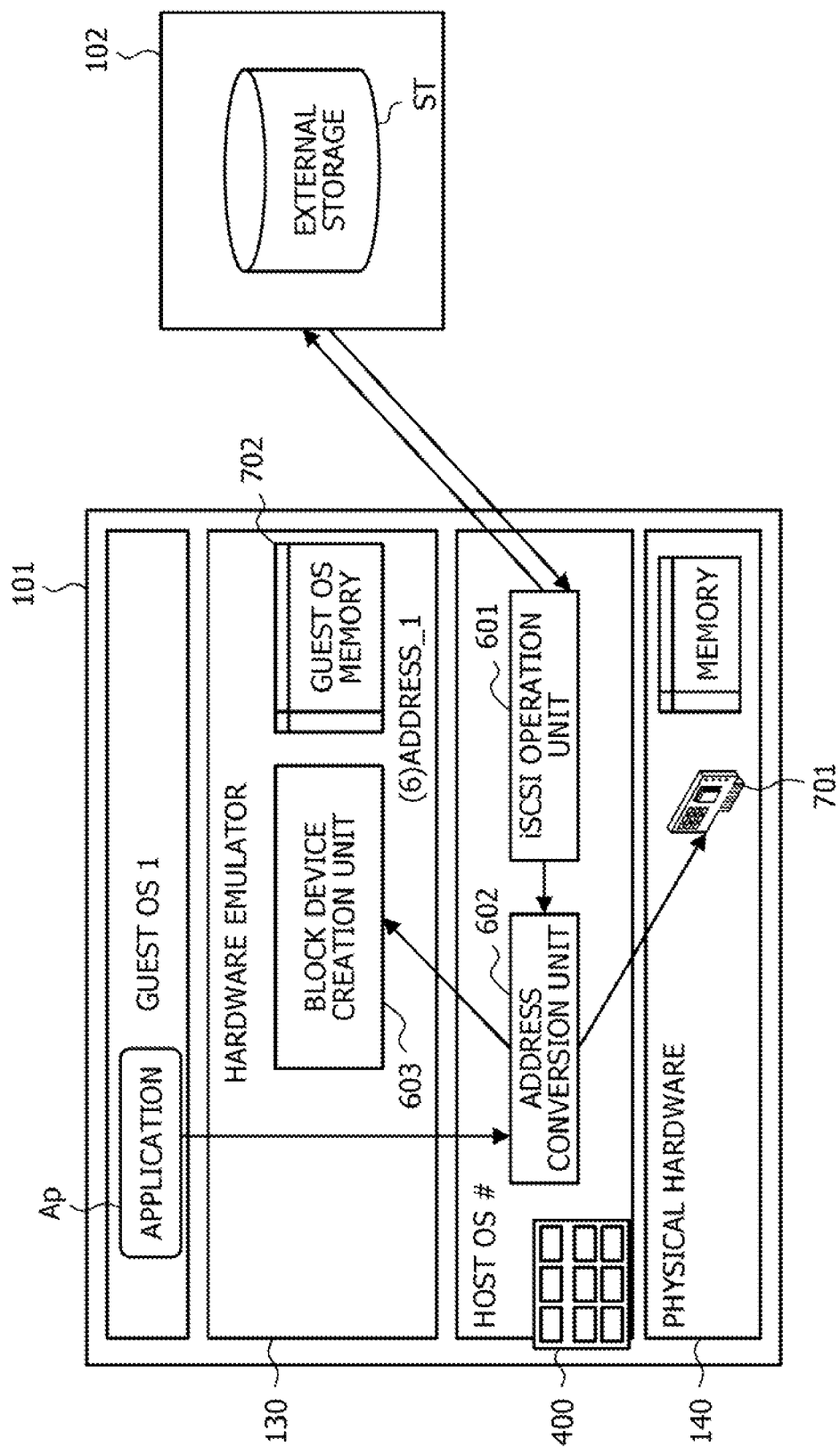
FIG. 9 is an explanatory diagram (part 3) illustrating the operation example in the setting phase of the storage system according to Embodiment 1.

FIGS. 7 to 9 are explanatory diagrams illustrating the operation examples in the setting phases of the storage system 100 according to Embodiment 1. In FIG. 7, (1) the iSCSI operation unit 601 performs the iSCSI login processing. (2) The iSCSI operation unit 601 monitors an iSCSI login response packet arriving at a NIC 701. The NIC 701 is a NIC that transmits and receives the iSCSI packet corresponding to the logged-in guest OS 1.

(3) When the iSCSI login response packet arrives at the NIC 701, the iSCSI operation unit 601 acquires the head address (address_1) of the SCSI data in the iSCSI login response packet stored in the buffer of the NIC 701. The SCSI data includes, for example, a login response. The iSCSI operation unit 601 sends the acquired head address (address_1) to the address conversion unit 602.

In FIG. 8, (4) the address conversion unit 602 converts the head address (address_1) into a guest physical address (ADDRESS_1), and stores the guest physical address in the address management table 400. (5) The address conversion unit 602 sends the converted guest physical address (ADDRESS_1) to the block device creation unit 603.

In FIG. 9, (6) the block device creation unit 603 creates the block device structure in a memory 702 of the guest OS 1, and writes the received guest physical address (ADDRESS_1) in the data address region of the block device structure. Accordingly, the block device is recognized by the guest OS 1.

Next, an operation example in an access phase will be described with reference to FIG. 10.

Figure 10:
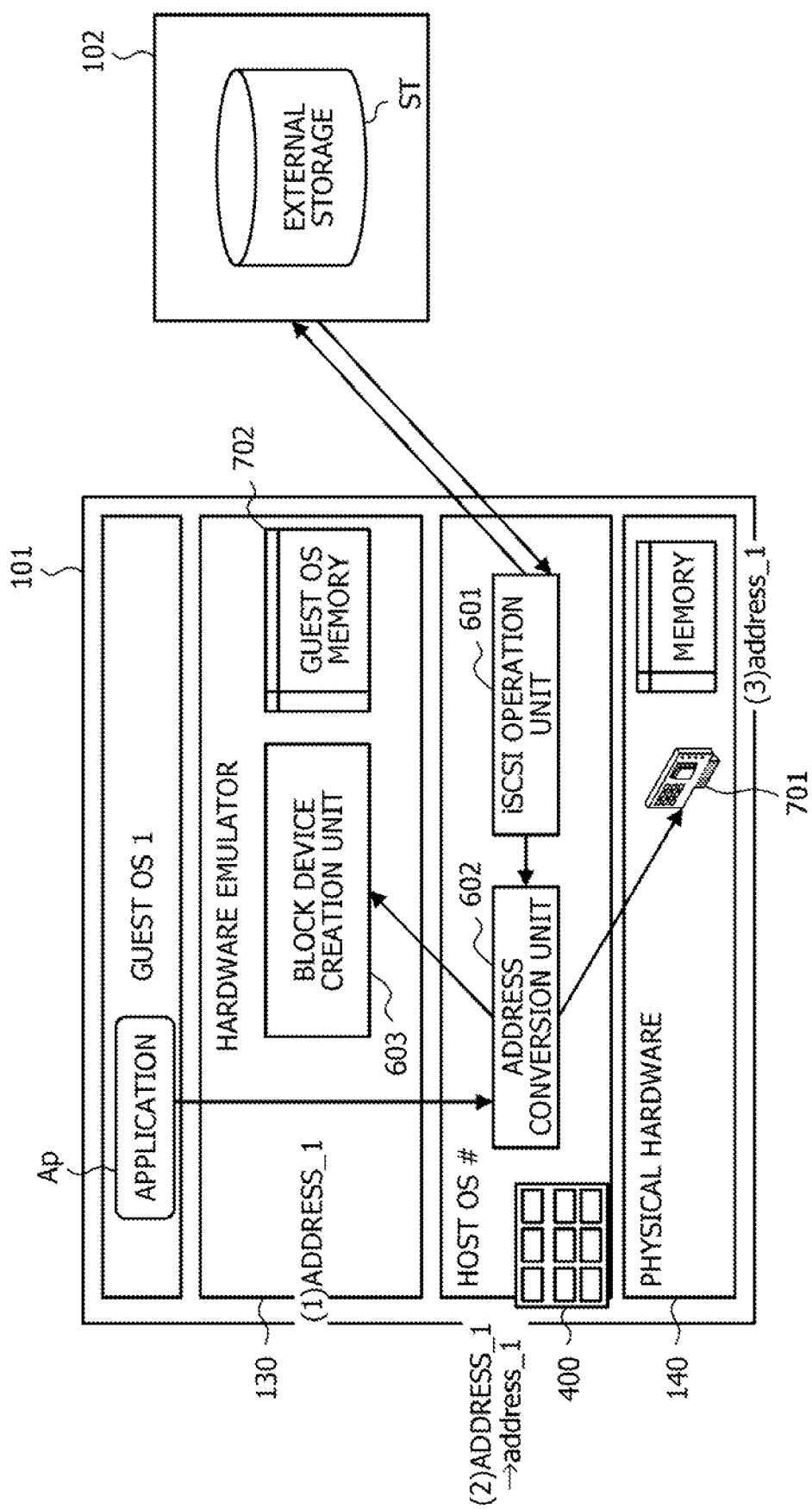
FIG. 10 is an explanatory diagram illustrating an operation example of an access phase of the storage system according to Embodiment 1.

FIG. 10 is an explanatory diagram illustrating the operation example in the access phase of the storage system 100 according to Embodiment 1. In FIG. 10, (1) the application Ap reads from the data address region (ADDRESS_1) of the block device.

(2) When the reading from the data address region (ADDRESS_1) is detected, the address conversion unit 602 converts the guest physical address (ADDRESS_1) into the corresponding host physical address (address_1) while referring to the address management table 400.

(3) The address conversion unit 602 directly reads data from the host physical address (address_1) in the buffer of the NIC 701. The address conversion unit 602 transfers the read data to the application Ap (guest OS $).

Accordingly, in an environment in which the iSCSI storage is used from the virtual machine VM (guest OS 1), since buffer copy between the host OS and the guest OS does not occur, high-speed access may be realized as compared with the means 1 of related art (method for attaching, as the block device, the iSCSI device attached to the VM by the host OS).

(Processing Procedure of Information Processing Apparatus 101)

Next, a processing procedure of the information processing apparatus 101 according to Embodiment 1 will be described. First, a setting process procedure of the information processing apparatus 101 will be described with reference to FIG. 11.

Figure 11:
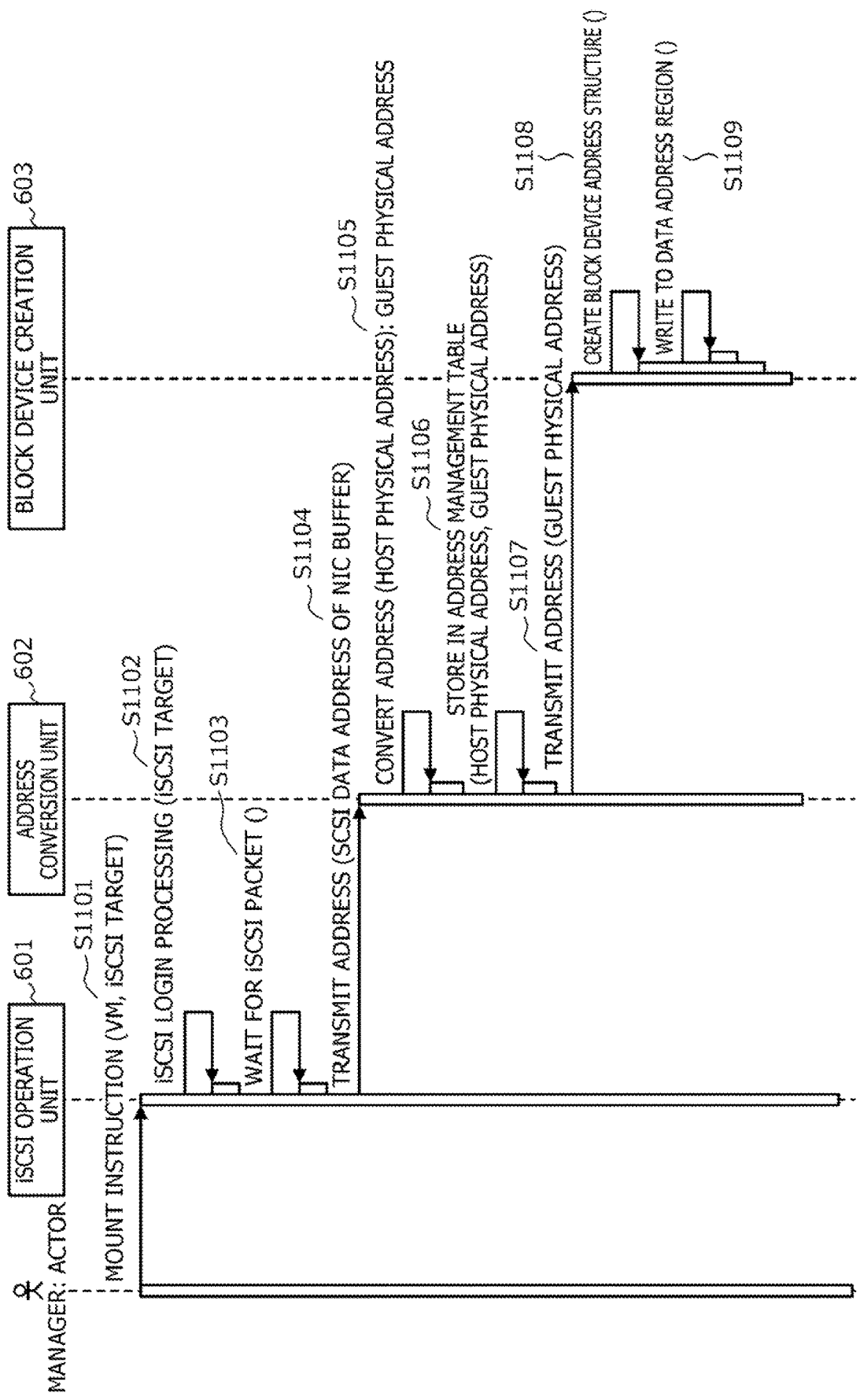
FIG. 11 is a sequence diagram illustrating an example of a setting process procedure of the information processing apparatus according to Embodiment 1.

FIG. 11 is a sequence diagram illustrating an example of the setting process procedure of the information processing apparatus 101 according to Embodiment 1. In FIG. 11, the iSCSI operation unit 601 receives a mount instruction from a manager (step S1101). The mount instruction is an instruction to mount (attach) an iSCSI target to the virtual machine VM (guest OS $). The iSCSI target is, for example, the external storage ST.

The mount instruction includes information for identifying the virtual machine VM (for example, the guest ID) and information for identifying the iSCSI target (for example, a device name and an IP address). For example, the iSCSI operation unit 601 receives the mount instruction by, for example, an operation input of the manager using an input device (not illustrated) or by receiving from a manager terminal (not illustrated).

When the mount instruction is received, the iSCSI operation unit 601 performs the iSCSI login processing to the iSCSI target (step S1102). Subsequently, the iSCSI operation unit 601 waits for the iSCSI login response packet (step S1103). When the iSCSI login response packet arrives at the NIC, the iSCSI operation unit 601 acquires the head address of the SCSI data in the iSCSI login response packet stored in the buffer of the NIC, and transmits the acquired head address to the address conversion unit 602 (step S1104).

When the head address (host physical address) is received, the address conversion unit 602 converts the received host physical address into the guest physical address (step S1105). Subsequently, the address conversion unit 602 stores the guest ID, the received host physical address, and the converted guest physical address in the address management table 400 in association with each other (step S1106). The guest ID is included, for example, in the mount instruction.

The address conversion unit 602 transmits the converted guest physical address to the block device creation unit 603 (step S1107). When the guest physical address is received, the block device creation unit 603 creates the block device structure in the memory of the guest OS $ (step S1108). The block device creation unit 603 writes the received guest physical address in the data address region of the block device structure (step S1109).

Accordingly, the virtual machine VM (guest OS $) may recognize the iSCSI target as the block device.

Next, an access processing procedure of the information processing apparatus 101 will be described with reference to FIG. 12.

Figure 12:
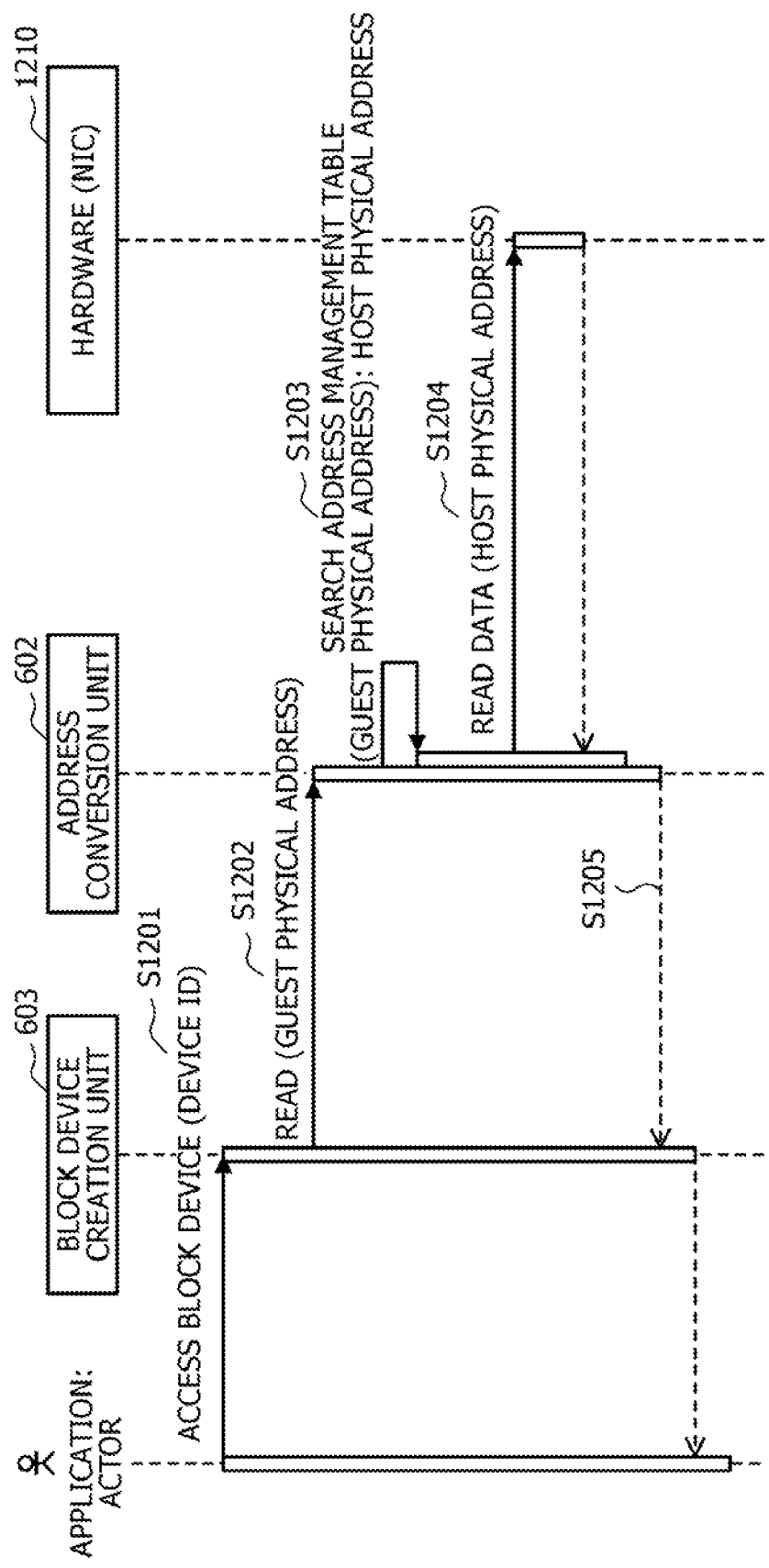
FIG. 12 is a sequence diagram illustrating an example of an access processing procedure of the information processing apparatus according to Embodiment 1.

FIG. 12 is a sequence diagram illustrating an example of the access processing procedure of the information processing apparatus 101 according to Embodiment 1. In FIG. 12, the block device creation unit 603 receives the access to the block device from the application Ap over the guest OS $ (step S1201).

Subsequently, the block device creation unit 603 reads an address (guest physical address) of the data address region of the block device structure corresponding to the device ID of the block device, and transmits the read address to the address conversion unit 602 (step S1202). At this time, the block device creation unit 603 also transmits, for example, the guest ID of the guest OS $.

When the address (guest physical address) is received, the address conversion unit 602 searches the address management table 400 for the address management information corresponding to the guest ID, and converts the received address (guest physical address) into the corresponding host physical address while referring to the searched address management information (step S1203).

Subsequently, the address conversion unit 602 reads data from the host physical address in a buffer of a hardware (NIC) 1210 (step S1204). The hardware (NIC) 1210 is a NIC at which the iSCSI packet arrives from the iSCSI target. The address conversion unit 602 transfers the read data to the application Ap via the block device creation unit 603 (step S1205).

Accordingly, the high-speed access may be realized in the environment in which the iSCSI storage is used from the virtual machine VM (guest OS $).

As described above, in accordance with the information processing apparatus 101 according to Embodiment 1, the host OS # may acquire the host physical address over the buffer in which the SCSI data is stored from the iSCSI packet stored in the buffer of the NIC, may convert the acquired host physical address into the guest physical address recognized by the guest OS $, and may store the acquired host physical address and the converted guest physical address in the storage unit 610 in association with each other. In accordance with the information processing apparatus 101, the hardware emulator 130 may create the block device structure used by the guest OS $ and may store the converted guest physical address in the data address region of the block device structure.

Accordingly, the virtual machine VM (guest OS $) may recognize the iSCSI target as the block device. A correspondence between the block device recognized by the guest OS $ and the buffer of the NIC storing the iSCSI packet from the iSCSI target may be stored.

In accordance with the information processing apparatus 101, when the reading of the guest OS $ from the data address region of the block device is detected, the host OS # may specify the host physical address corresponding to the guest physical address stored in the data address region while referring to the storage unit 610, may read data from the specified host physical address over the buffer of the NIC, and may transfer the read data to the guest OS $.

Accordingly, in the environment in which the iSCSI storage is used from the virtual machine VM (guest OS $), the buffer copy between the host OS and the guest OS does not occur, the high-speed access may be realized as compared with the means 1 of related art.

In accordance with the information processing apparatus 101, when the login processing to the iSCSI storage (external storage ST) related to the guest OS is executed and the login response packet from the iSCSI storage is stored in the buffer of the NIC, the host OS # may acquire the host physical address over the buffer in which the SCSI data is stored from the login response packet (iSCSI packet).

Accordingly, the storage coupling management may be performed by performing the login processing to the iSCSI storage related to the guest OS $ on the infrastructure side. Since the user does not have to perform the login processing, the convenience for the user may be improved.

From the above, in accordance with the information processing apparatus 101, in the environment in which the iSCSI storage is used from the virtual machine VM (guest OS $), the coupling management from the infrastructure may be performed at a higher speed than that of the means 1 of related art (method for attaching, as the block device, the iSCSI device attached to the virtual machine by the host OS) and which may not be realized by the means 2 of related art (method for directly attaching the iSCSI device to the virtual machine by PCI pass-through).

Embodiment 2

Next, an information processing apparatus 101 according to Embodiment 2 will be described. In Embodiment 2, a case where the guest OS $ issues a direct memory access (DMA) transfer request to the block device when the iSCSI device is used will be described. The illustration and description of parts similar to the parts described in Embodiment 1 are omitted.

(Stored Contents of DMA Address Management Table 1300)

First, contents stored in a DMA address management table 1300 of the host OS # will be described. The DMA address management table 1300 is realized by the storage device such as, for example, the memory 202 or the disk 204 illustrated in FIG. 2.

Figure 13:
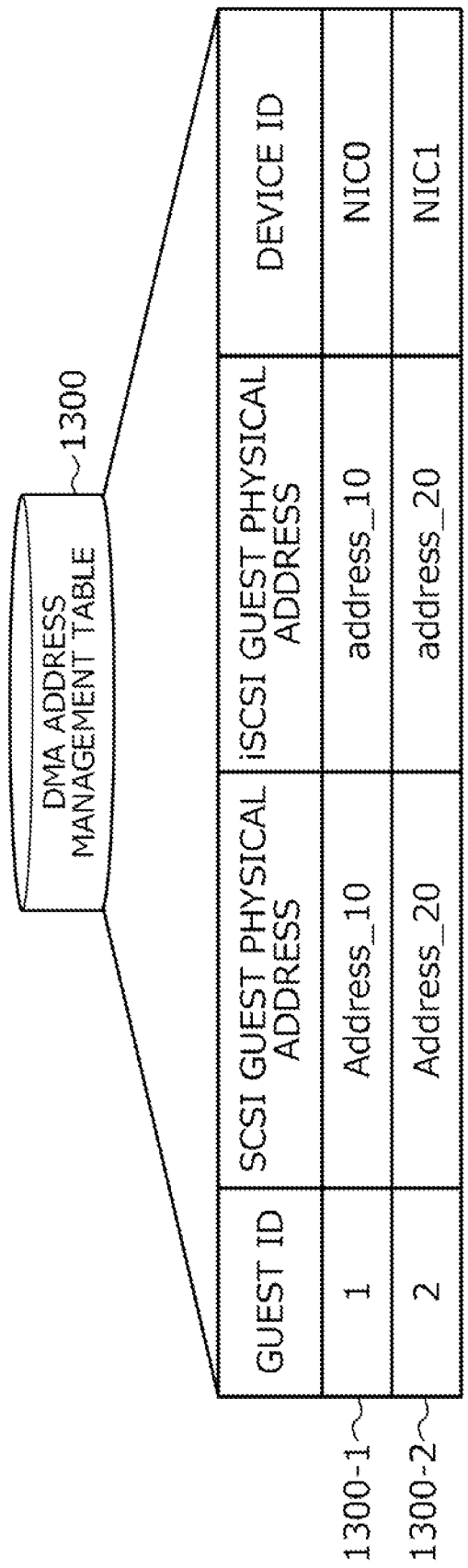
FIG. 13 is an explanatory diagram illustrating an example of stored contents of a DMA address management table.

FIG. 13 is an explanatory diagram illustrating an example of the stored contents of the DMA address management table 1300. In FIG. 13, the DMA address management table 1300 has fields of a guest ID, a SCSI guest physical address, an iSCSI guest physical address, and a device ID. Information in each field is set, and thus, pieces of DMA address management information (for example, DMA address management information 1300-1 and 1300-2) are stored as records.

The guest ID is an identifier that uniquely identifies the guest OS $ (virtual machine VM) operating over the information processing apparatus 101. The SCSI guest physical address indicates a head address over a buffer in which SCSI data is stored from an iSCSI packet stored in the buffer secured in the guest OS $.

For example, the SCSI guest physical address may be information indicating an offset from the iSCSI guest physical address. The iSCSI guest physical address indicates a head address of a buffer for storing an iSCSI packet secured for the guest OS $. The device ID is a device ID that uniquely identifies hardware that requests DMA transfer.

(Functional Configuration Example of Information Processing Apparatus 101)

Next, a functional configuration example of the information processing apparatus 101 according to Embodiment 2 will be described.

Figure 14:
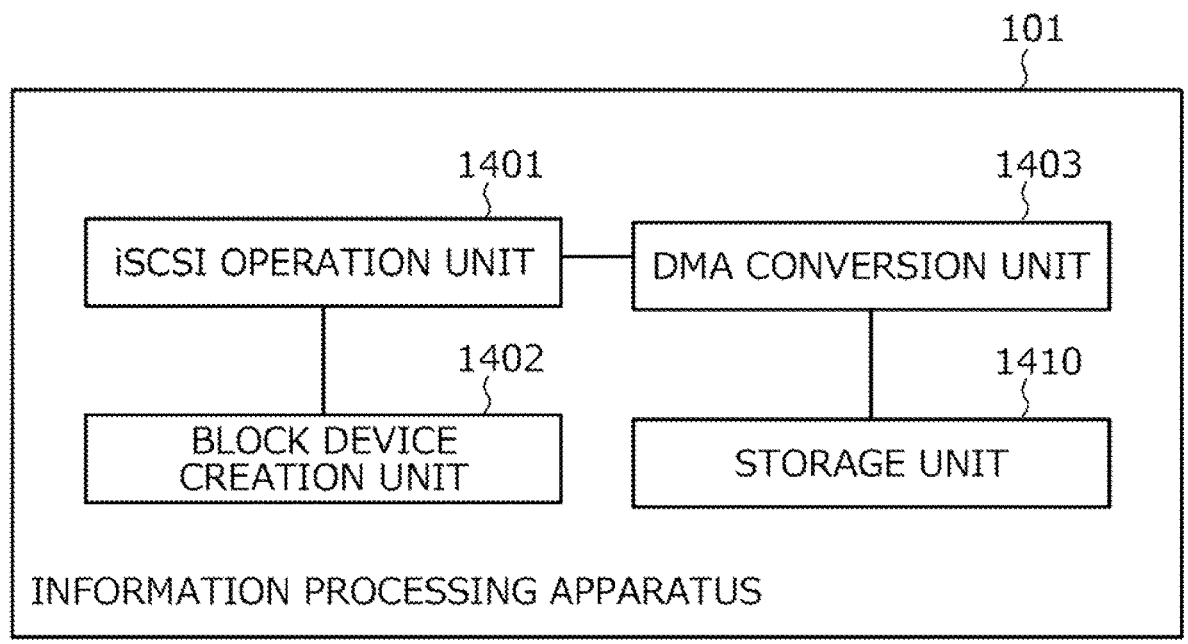
FIG. 14 is a block diagram illustrating a functional configuration example of an information processing apparatus according to Embodiment 2.

FIG. 14 is a block diagram illustrating a functional configuration example of the information processing apparatus 101 according to Embodiment 2. In FIG. 14, the information processing apparatus 101 includes an iSCSI operation unit 1401, a block device creation unit 1402, a DMA conversion unit 1403, and a storage unit 1410. The iSCSI operation unit 1401 to the block device creation unit 1402 function as a first control unit and a second control unit. For example, the functions are realized by the CPU 201 executing the program stored in the storage device such as, for example, the memory 202, the disk 204, or the portable recording medium 207 illustrated in FIG. 2 or by the communication I/F 205. A processing result of each functional unit is stored in the storage device such as, for example, the memory 202 or the disk 204. The storage unit 1410 is realized by the storage device such as, for example, the memory 202 or the disk 204. For example, the iSCSI operation unit 1401 and the DMA conversion unit 1403 operate over the host OS #(first control unit). The block device creation unit 1402 operates over the hardware emulator 130 (second control unit). The storage unit 1410 stores, for example, the DMA address management table 1300 illustrated in FIG. 13.

The iSCSI operation unit 1401 performs iSCSI login processing. The iSCSI operation unit 1401 monitors the iSCSI packet arriving at the NIC (physical storage region) after the login processing. When the iSCSI packet (iSCSI login response packet) arrives at the NIC, the iSCSI operation unit 1401 requests the block device creation unit 1402 to create a block device structure for the guest OS.

When the request to create the block device structure is received, the block device creation unit 1402 creates the block device structure used by the guest OS $. The block device creation unit 1402 creates a buffer having an iSCSI packet size in the memory of the guest OS $. The iSCSI packet size may be determined in advance, for example, or may be acquired by the block device creation unit 1402 making an inquiry to the iSCSI operation unit 1401.

The block device creation unit 1402 acquires the first guest physical address over the buffer in which the iSCSI packet is stored. The first guest physical address is, for example, a guest physical address indicating the head address of the iSCSI packet stored in the memory of the guest OS $.

The block device creation unit 1402 acquires a second guest physical address over the buffer in which the SCSI data is stored from the iSCSI packet stored in the created buffer. The second guest physical address is, for example, a guest physical address indicating the head address of the SCSI data in the iSCSI packet.

For example, the second guest physical address is information indicating an offset from the head address (first guest physical address) of the buffer in which the iSCSI packet is stored. The second guest physical address (offset) may be determined in advance, for example, or may be acquired by the block device creation unit 1402 making an inquiry to the iSCSI operation unit 1401.

The block device creation unit 1402 writes the acquired second guest physical address in the data address region of the created block device structure. When the block device structure is created, the block device is recognized by the guest OS $. The second guest physical address written in the data address region of the block device structure is recognized by the guest OS $ as an address of a memory of a transfer destination of the DMA transfer using the block device as a transfer source, for example.

The DMA conversion unit 1403 stores the acquired first guest physical address, the acquired second guest physical address, and the device having the physical storage region in the storage unit 1410 in association with each other. The device having the physical storage region is, for example, a NIC at which the iSCSI login response packet arrives. For example, the DMA conversion unit 1403 receives the first guest physical address and the second guest physical address from the block device creation unit 1402 via the iSCSI operation unit 1401.

For example, the DMA conversion unit 1403 stores the device ID, the first guest physical address (iSCSI guest physical address), and the second guest physical address (SCSI guest physical address) in, for example, the DMA address management table 1300 in association with each other. The device ID is a device ID of hardware that requests DMA transfer, and is, for example, a NIC at which the iSCSI login response packet arrives. The hardware that requests the DMA transfer is, for example, a NIC that receives the iSCSI packet from the external storage ST (storage device 102).

The DMA conversion unit 1403 detects a DMA transfer request from the guest OS $. The DMA is one of data transfer methods in a computer system, and is a method for directly performing data transfer between a peripheral device, a memory, and the like without using a CPU. The DMA transfer request requests a DMA controller (for example, a DMA controller 1510 illustrated in FIG. 15 to be described later) to perform DMA transfer.

The DMA controller is a dedicated circuit that controls DMA transfer. The DMA controller is included in the physical hardware 140 (see FIG. 1) and is coupled to the CPU 201, the memory 202, the peripheral device, and the like. For example, a DMA transfer destination address and a device ID of the block device are included in the DMA transfer request. The DMA transfer destination address is an address of a DMA transfer destination (second guest physical address: SCSI guest physical address). The block device is a block device that is a DMA transfer source.

When the DMA transfer request is detected, the DMA conversion unit 1403 specifies the first guest physical address (iSCSI guest physical address) and the device corresponding to the second guest physical address (SCSI guest physical address) which is the DMA transfer destination included in the DMA transfer request while referring to the storage unit 1410.

For example, when the DMA transfer request is detected, the DMA conversion unit 1403 search for the DMA address management information corresponding to the SCSI guest physical address that is the DMA transfer destination included in the DMA transfer request while referring to, for example, the DMA address management table 1300. Subsequently, the DMA conversion unit 1403 specifies the device ID and the iSCSI guest physical address while referring to the searched DMA address management information.

The DMA conversion unit 1403 notifies the DMA controller of the specified device ID and iSCSI guest physical address. For example, the DMA conversion unit 1403 notifies the DMA controller of, for example, the DMA transfer request including the device ID (DMA transfer source) and the iSCSI guest physical address (DMA transfer destination).

When the device ID and the iSCSI guest physical address are received, the DMA controller reads data of the DMA transfer source identified from the device ID. The DMA transfer source is hardware that requests DMA transfer, and is, for example, a NIC that receives the iSCSI packet from the external storage ST (storage device 102).

The DMA controller converts the iSCSI guest physical address into a machine physical address by a Vt-d mechanism. The Vt-d mechanism is an I/O-virtualization method (Intel Virtualization Technology for Directed I/O) for providing a high-speed I/O to the virtual machine VM.

When the guest OS issues the DMA transfer request to the DMA controller, data transfer is performed between the memory and the device by DMA. At this time, since the guest physical address is notified, the Vt-d mechanism converts the guest physical address into the host physical address, and thus, the DMA transfer to the memory space of the guest OS created in advance may be performed.

The machine physical address converted from the iSCSI guest physical address is a machine physical address (memory space of the guest OS $ created in advance) that is the DMA transfer destination. The DMA controller DMA-transfers the read data to the buffer of the guest OS $ indicated by the converted machine physical address.

As a result, the data of the iSCSI device (data in the buffer of the NIC) is DMA-transferred to the memory space of the guest OS $ created in advance.

The information processing apparatus 101 according to Embodiment 2 has the same functions as the functions of the information processing apparatus 101 according to Embodiment 1 (for example, the iSCSI operation unit 601, the address conversion unit 602, the block device creation unit 603, and the storage unit 610). However, the information processing apparatus 101 according to Embodiment 2 may not have the functions of the information processing apparatus 101 according to Embodiment 1.

(Operation Example of Storage System 100)

Next, an operation example of the storage system 100 according to Embodiment 2 will be described. First, operation examples in setting phases will be described with reference to FIGS. 15 to 17. It is assumed that the guest OS $ is a "guest OS 1".

Figure 15:
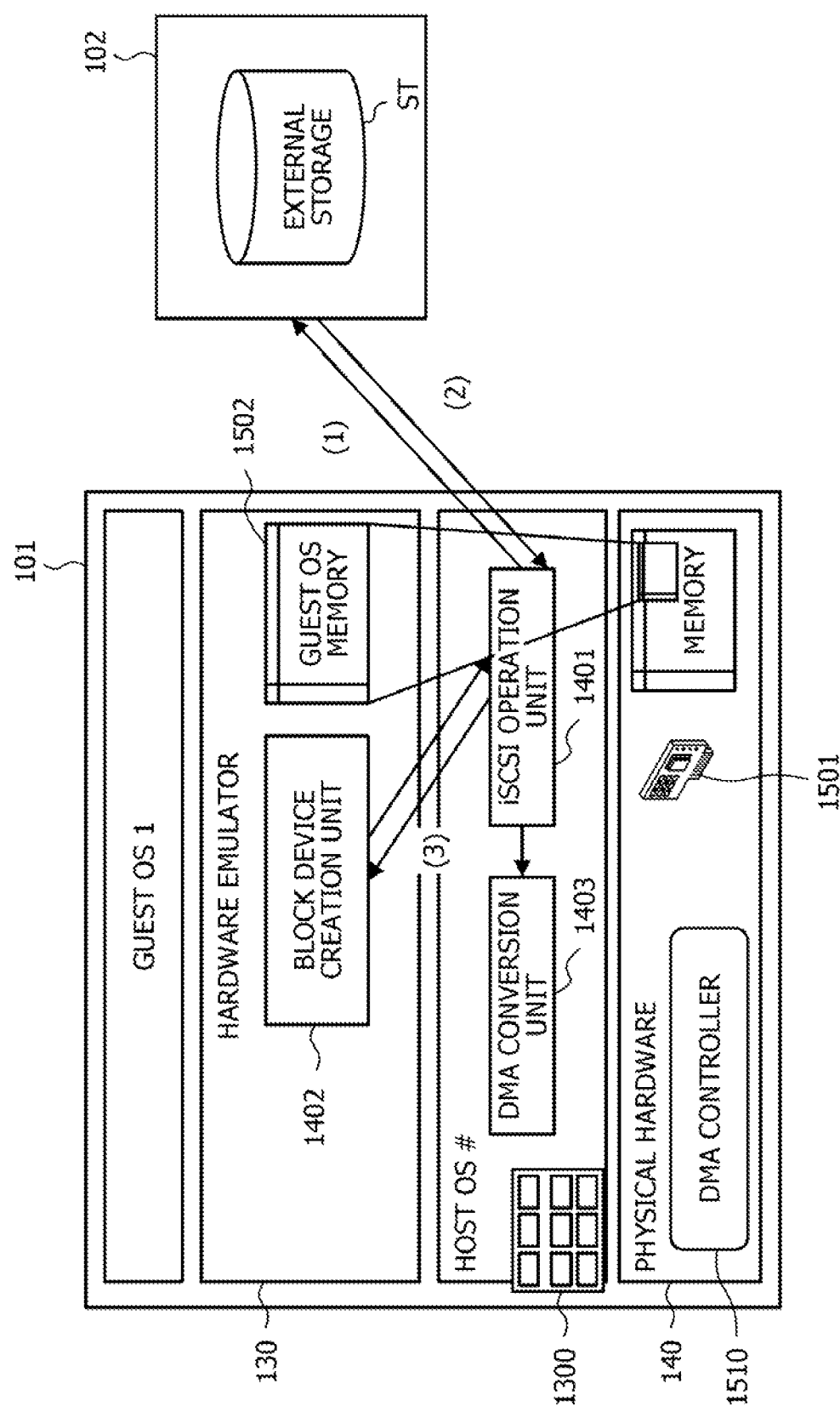
FIG. 15 is an explanatory diagram (part 1) illustrating an operation example in a setting phase of a storage system according to Embodiment 2.
Figure 16:
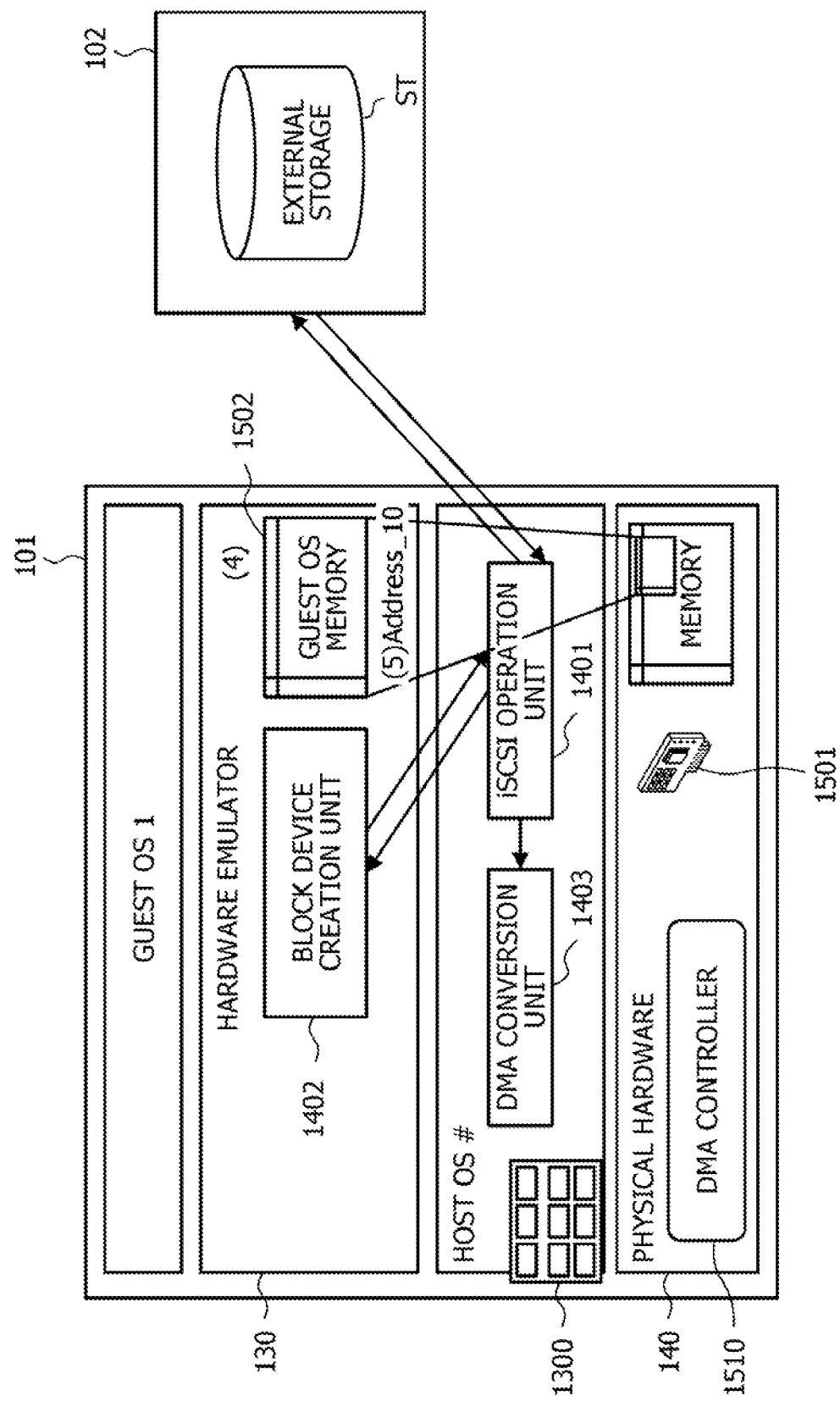
FIG. 16 is an explanatory diagram (part 2) illustrating the operation example in the setting phase of the storage system according to Embodiment 2.
Figure 17:
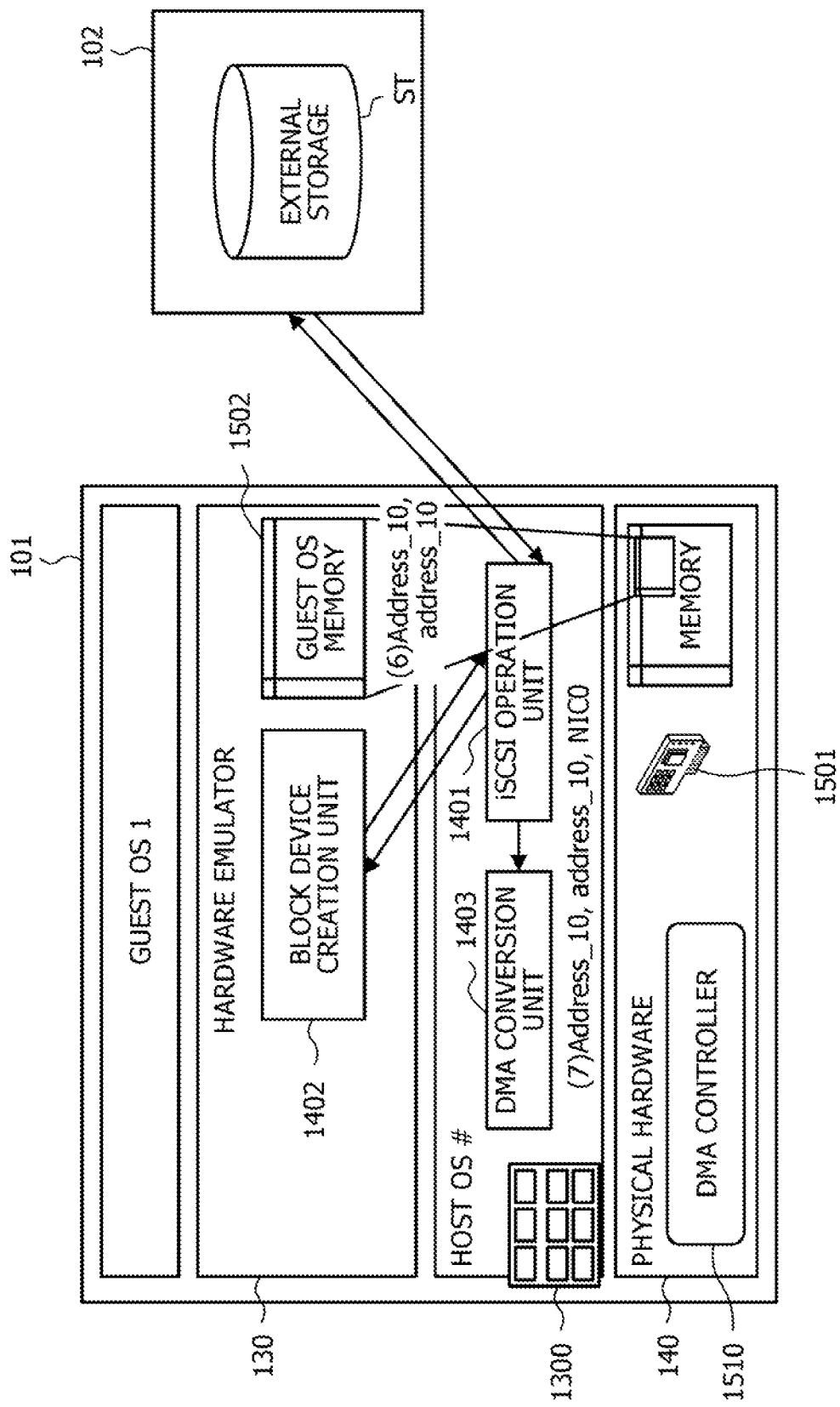
FIG. 17 is an explanatory diagram (part 3) illustrating the operation example in the setting phase of the storage system according to Embodiment 2.

FIGS. 15 to 17 are explanatory diagrams illustrating the operation examples in the setting phases of the storage system 100 according to Embodiment 2. In FIG. 15, (1) the iSCSI operation unit 1401 performs the iSCSI login processing. (2) The iSCSI operation unit 1401 monitors the iSCSI login response packet arriving at a NIC 1501. The NIC 1501 is a NIC that transmits and receives the iSCSI packet corresponding to the logged-in guest OS 1.

(3) When the iSCSI login response packet arrives at the NIC 1501, the iSCSI operation unit 1401 requests the block device creation unit 1402 to create the block device structure for the guest OS 1. It is assumed that a device ID of the NIC 1501 is a "NIC0".

In FIG. 16, (4) when the request to create the block device structure for the guest OS 1 is received, the block device creation unit 1402 creates the block device structure used by the guest OS 1 in the memory 1502 of the guest OS 1.

(5) The block device creation unit 1402 creates the buffer having the iSCSI packet size in the memory 1502 of the guest OS 1, and stores the head address (Address_10) of the SCSI data in the data address region of the block device structure. Accordingly, the block device is recognized by the guest OS 1. The guest OS 1 recognizes the guest physical address (Address_10) written in the data address region of the block device structure as the address of the memory of the transfer destination of the DMA transfer using the block device as the transfer source.

In FIG. 17, (6) the block device creation unit 1402 returns the device ID (NIC0), the address of the iSCSI buffer (address_10), and the address of the SCSI data (Address_10) to the iSCSI operation unit 1401. The iSCSI operation unit 1401 transfers the device ID (NIC0), the address (address_10) of the iSCSI buffer, and the address (Address_10) of the SCSI data to the DMA conversion unit 1403.

(7) The DMA conversion unit 1403 stores the device ID (NIC0), the address (address_10) of the iSCSI buffer, and the address (Address_10) of the SCSI data in the DMA address management table 1300 in association with each other. Accordingly, the correspondence between the block device (SCSI guest physical address or iSCSI guest physical address) and the NIC 1501 (device ID) is stored.

Next, an operation example in an access phase will be described with reference to FIG. 18.

Figure 18:
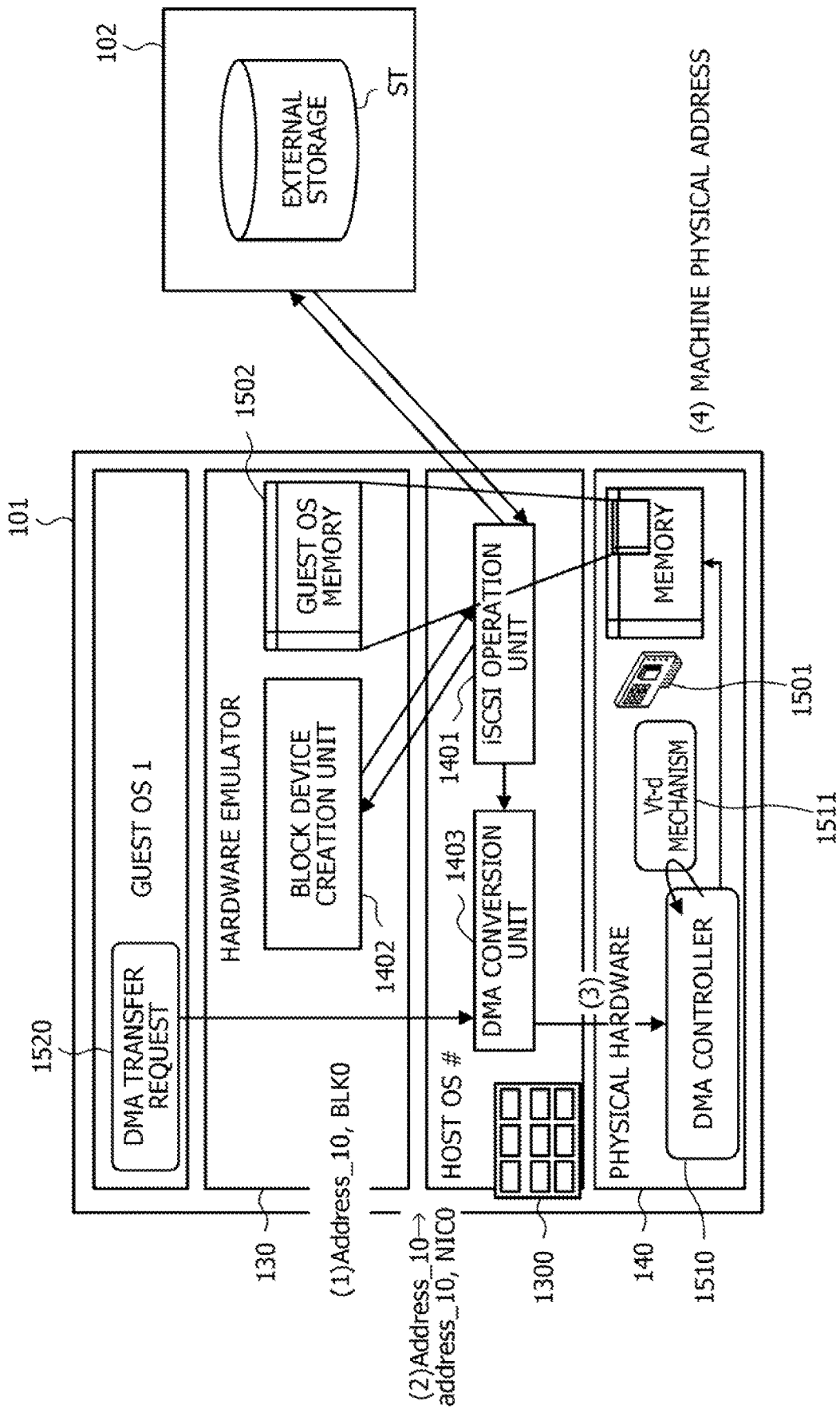
FIG. 18 is an explanatory diagram illustrating an operation example in an access phase of the storage system according to Embodiment 2.

FIG. 18 is an explanatory diagram illustrating the operation example in the access phase of the storage system 100 according to Embodiment 2. In FIG. 18, (1) the DMA conversion unit 1403 detects a DMA transfer request 1520 from the guest OS 1 to the DMA controller 1510. The DMA transfer request 1520 includes a DMA transfer destination address "Address_10" and a device ID "BLK0" of the block device that is the transfer source.

(2) When the DMA transfer request 1520 is detected, the DMA conversion unit 1403 searches for the DMA address management information 1300-1 corresponding to the DMA transfer destination address "Address_10" included in the DMA transfer request 1520 while referring to the DMA address management table 1300. The DMA conversion unit 1403 specifies the device ID "NIC0" and the iSCSI guest physical address "address_10" while referring to the searched DMA address management information 1300-1.

(3) The DMA conversion unit 1403 notifies the DMA controller 1510 of the specified device ID "NIC0" and the iSCSI guest physical address "address_10".

(4) When the device ID "NIC0" and the iSCSI guest physical address "address_10" are received, the DMA controller 1510 reads data from the buffer of the NIC 1501 identified from the device ID "NIC0". The DMA controller 1510 converts the iSCSI guest physical address "address_10" into the machine physical address by a Vt-d mechanism 1511. The DMA controller 1510 DMA-transfers the read data to the buffer of the guest OS 1 indicated by the converted machine physical address.

Accordingly, the DMA transfer request 1520 from the guest OS 1 to the block device may be converted into the DMA transfer request to the NIC 1501, and the data of the NIC 1501 may be DMA-transferred to the buffer of the guest OS 1.

(Processing Procedure of Information Processing Apparatus 101)

Next, a processing procedure of the information processing apparatus 101 according to Embodiment 2 will be described. First, a setting process procedure of the information processing apparatus 101 will be described with reference to FIG. 19.

Figure 19:
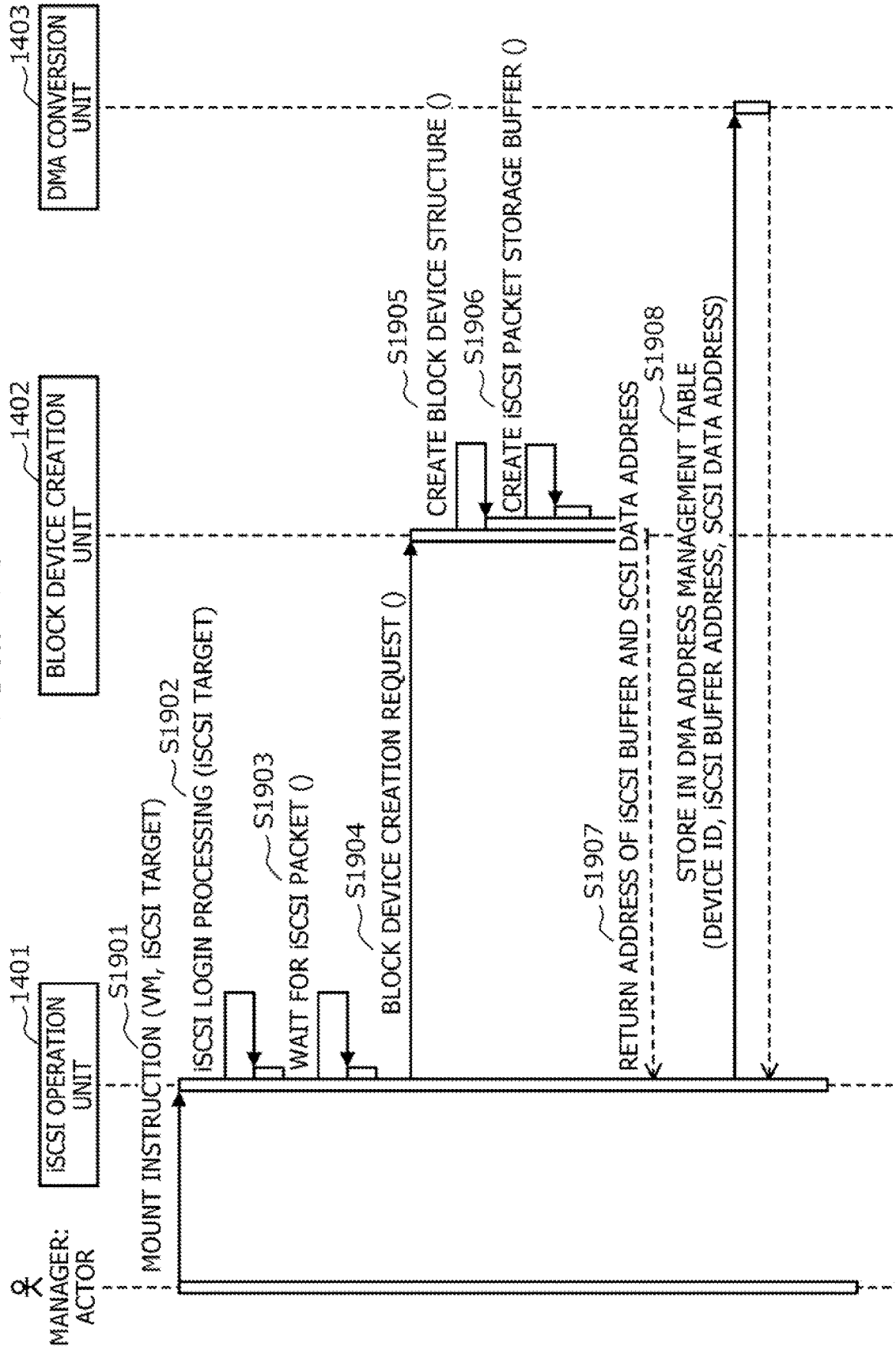
FIG. 19 is a sequence diagram illustrating an example of a setting process procedure of the information processing apparatus according to Embodiment 2.

FIG. 19 is a sequence diagram illustrating an example of the setting process procedure of the information processing apparatus 101 according to Embodiment 2. In FIG. 19, the iSCSI operation unit 1401 receives a mount instruction from the manager (step S1901). When the mount instruction is received, the iSCSI operation unit 1401 performs the iSCSI login processing to the iSCSI target (step S1902).

Subsequently, the iSCSI operation unit 1401 waits for the iSCSI login response packet (step S1903). When the iSCSI login response packet arrives at the MC, the iSCSI operation unit 1401 transmits the block device creation request to the block device creation unit 1402 (step S1904). The block device creation request is a request to create the block device structure for the guest OS.

When the block device creation request is received, the block device creation unit 1402 creates the block device structure used by the guest OS $ (step S1905). Subsequently, the block device creation unit 1402 creates an iSCSI packet storage buffer in the memory of the guest OS $, and stores the head address of the SCSI data in the data address region of the block device structure (step S1906). The iSCSI packet storage buffer is a buffer having an iSCSI packet size.

The block device creation unit 1402 returns the device ID, the address of the iSCSI buffer, and the address of the SCSI data to the iSCSI operation unit 1401 (step S1907). The iSCSI operation unit 1401 transfers the device ID, the address of the iSCSI buffer, and the address of the SCSI data to the DMA conversion unit 1403.

The DMA conversion unit 1403 stores the device ID, the address of the iSCSI buffer, and the address of the SCSI data in the DMA address management table 1300 in association with each other (step S1908).

Accordingly, the correspondence between the block device (SCSI guest physical address or iSCSI guest physical address) and the NIC (device ID) may be stored.

Figure 20:
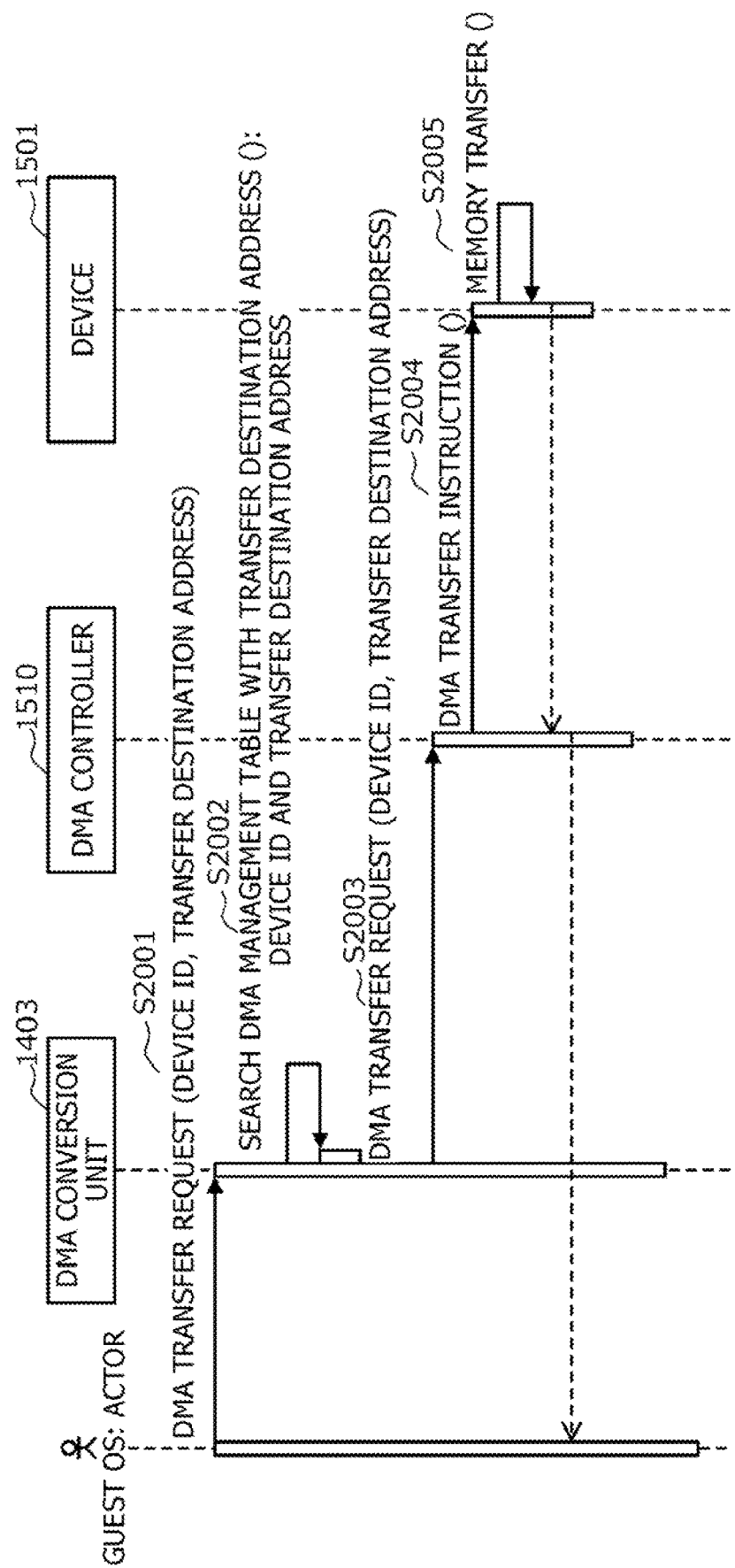
FIG. 20 is a sequence diagram illustrating an example of an access processing procedure of the information processing apparatus according to Embodiment 2.

Next, an access processing procedure of the information processing apparatus 101 will be described with reference to FIG. 20. FIG. 20 is a sequence diagram illustrating an example of the access processing procedure of the information processing apparatus 101 according to Embodiment 2. In FIG. 20, the DMA conversion unit 1403 detects the DMA transfer request from the guest OS $ to the DMA controller 1510 (step S2001). The DMA transfer request includes the device ID (block device) and the transfer destination address (SCSI guest physical address).

Subsequently, the DMA conversion unit 1403 searches for the DMA address management information corresponding to the transfer destination address while referring to the DMA address management table 1300, and specifies the device ID (NIC) and the transfer destination address (iSCSI guest physical address) while referring to the searched DMA address management information (step S2002). The DMA conversion unit 1403 notifies the DMA controller 1510 of the specified device ID (NIC) and the specified transfer destination address (iSCSI guest physical address) (step S2003).

The DMA controller 1510 converts the transfer destination address (iSCSI guest physical address) into the transfer destination address (machine physical address) by the Vt-d mechanism 1511, and transmits the DMA transfer instruction to the device 1501 (for example, corresponding to the NIC 1501 illustrated in FIG. 15) identified from the device ID (step S2004).

When the DMA transfer instruction is received, the device 1501 transfers the data in the buffer to the designated transfer destination address (machine physical address) in the memory (step S2005). When the memory transfer is completed, a memory transfer completion notification is transmitted from the device 1501 to the DMA controller 1510. When the memory transfer completion notification is received, the DMA controller 1510 transmits a DMA transfer completion notification to the guest OS $.

Accordingly, the DMA transfer request from the guest OS $ to the block device may be converted into the DMA transfer request to the device 1501 (NIC), and the data of the device 1501 may be DMA-transferred to the buffer of the guest OS $.

As described above, in accordance with the information processing apparatus 101 according to Embodiment 2, when the login processing to the iSCSI storage (external storage ST) related to the guest OS $ is executed and the login response packet from the iSCSI storage is stored in the buffer of the NIC, the host OS # may request the hardware emulator 130 to create the block device structure used by the guest OS $. In accordance with the information processing apparatus 101, the hardware emulator 130 may create the block device structure in response to the request from the host OS # and may create the buffer having the size corresponding to the size of the iSCSI packet in the memory of the guest OS $. In accordance with the information processing apparatus 101, the hardware emulator 130 may acquire the first guest physical address indicating the head address of the buffer and the second guest physical address indicating the head address over the buffer in which the SCSI data is stored from the iSCSI packet, and may store the second guest physical address in the data address region of the block device structure. In accordance with the information processing apparatus 101, the host OS # may store the first guest physical address, the second guest physical address, and the device which are acquired by the hardware emulator 130 in the storage unit 1410 in association with each other. The device is, for example, a NIC at which the login response packet arrives.

Accordingly, the correspondence between the block device (SCSI guest physical address or iSCSI guest physical address) and the MC (device ID) may be stored.

In accordance with the information processing apparatus 101, when the DMA transfer request from the guest OS $ to the DMA controller 1510 with the block device as the transfer source and the second guest physical address stored in the data address region as the transfer destination is detected, the host OS # may specify the first guest physical address and the device (NIC) corresponding to the second guest physical address while referring to the storage unit 1410, and may notify the DMA controller 1510 of the DMA transfer request with the specified device as the transfer source and the specified first guest physical address as the transfer destination.

Accordingly, the DMA transfer request from the guest OS $ to the block device may be converted into the DMA transfer request to the NIC, and the data in the buffer of the NIC may be DMA-transferred to the buffer of the guest OS $.

The access control method described in the present embodiment may be realized by causing the computer such as the information processing apparatus to execute a program prepared in advance. The access control program is recorded on a computer-readable recording medium such as a hard disk, a flexible disk, the CD-ROM, the DVD, or the USB memory and is executed by being read by the computer from the recording medium. The access control program may also be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus coupled to a storage device via a network, the information processing apparatus comprising:
a memory; and
a processor coupled to the memory and configured to:
acquire a host physical address from a physical storage region in which information regarding an access to the storage device from a guest operating system (OS) operating in the information processing apparatus is stored from a first packet stored in the physical storage region storing the first packet obtained by encapsulating the information regarding the access;
convert the acquired host physical address into a guest physical address recognized by the guest OS;
store the host physical address and the guest physical address in the memory in association with each other; create a data structure of a block device used by the guest OS;
store the guest physical address which is converted in a data address region of the data structure;
specify the host physical address corresponding to the guest physical address stored in the data address region while referring to the memory when reading from the data address region is detected;
read data from the specified host physical address over the physical storage region; and
transfer the read data to the guest OS.

2. The information processing apparatus according to claim 1, wherein, the processor executes login processing to the storage device related to the guest OS, and acquire the host physical address from the physical storage region in which the information regarding the access is stored from a login response packet from the storage device when the login response packet is stored in the physical storage region.

3. The information processing apparatus according to claim 1, wherein the information regarding the access includes a Small Computer System Interface (SCSI) command and a response, and the packet is an Internet Small Computer System Interface (iSCSI) packet.

4. The information processing apparatus according to claim 1, wherein the physical storage region is a buffer of a network interface card (MC) that transmits and receives a packet transmitted from the storage device via the network.

5. The information processing apparatus according to claim 1, wherein the processor executes login processing to the storage device related to the guest OS, create the data structure of the block device used by the guest OS when a login response packet from the storage device is stored in the physical storage region, creates a buffer having a size corresponding to a size of the packet in a memory of the guest OS, acquires a first guest physical address indicating a head address of the buffer and a second guest physical address indicating a head address of the buffer in which the information regarding the access to the storage device is stored from the packet, stores the second guest physical address in the data address region of the data structure, stores the first guest physical address and the second guest physical address which are acquired and a device having the physical storage region in the memory in association with each other, specifies the first guest physical address and the device corresponding to the second guest physical address while referring to the memory when a direct memory access (DMA) transfer request from the guest OS to a DMA controller with the block device as a transfer source and the second guest physical address stored in the data address region as a transfer destination is detected, and notifies the DMA controller of the DMA transfer request with the device as a transfer source and the specified first guest physical address as a transfer destination.

6. A non-transitory computer-readable recording medium having stored therein an access control program causing a computer coupled to a storage device via a network to execute a process, the process comprising:
- acquiring a host physical address from a physical storage region in which information regarding an access to the storage device from a guest OS operating over the computer is stored from a first packet stored in the physical storage region storing the first packet obtained by encapsulating the information regarding the access;
- converting the acquired host physical address into a guest physical address recognized by the guest OS, and storing the host physical address and the guest physical address in a memory in association with each other;
- creating a data structure of a block device used by the guest OS, and storing the converted guest physical address in a data address region of the data structure;
- specifying the host physical address corresponding to the guest physical address stored in the data address region while referring to the memory when reading from the data address region is detected; and
- reading data from the specified host physical address over the physical storage region, and transferring the read data to the guest OS.

* * * * *